US011065626B2

(12) United States Patent
Reiter

(10) Patent No.: US 11,065,626 B2
(45) Date of Patent: Jul. 20, 2021

(54) MONITORING AND CONTROL DEVICE FOR THE AUTOMATED OPTIMIZATION OF THE GRINDING LINE OF A ROLLER SYSTEM AND CORRESPONDING METHOD

(71) Applicant: BÜHLER AG, Uzwil (CH)

(72) Inventor: Emanuel Reiter, Uzwil (CH)

(73) Assignee: BUHLER AG, Uzwil (CH)

(*) Notice: Subject to any disclaimer, the term of this patent is extended or adjusted under 35 U.S.C. 154(b) by 200 days.

(21) Appl. No.: 16/282,757

(22) Filed: Feb. 22, 2019

(65) Prior Publication Data
US 2019/0240672 A1 Aug. 8, 2019

Related U.S. Application Data

(63) Continuation of application No. PCT/EP2017/071060, filed on Aug. 21, 2017.

(30) Foreign Application Priority Data

Aug. 22, 2016 (CH) ........................ 1075/16

(51) Int. Cl.
B02C 25/00 (2006.01)
B02C 4/32 (2006.01)
(Continued)

(52) U.S. Cl.
CPC .............. B02C 25/00 (2013.01); B02C 4/06 (2013.01); B02C 4/30 (2013.01); B02C 4/32 (2013.01); B02C 4/38 (2013.01); B02C 4/44 (2013.01); G06N 20/00 (2019.01); H02J 50/10 (2016.02); B02C 2210/01 (2013.01)

(58) Field of Classification Search
CPC .... B02C 4/30; B02C 4/38; B02C 4/06; B02C 4/44; B02C 4/32; B02C 25/00; B02C 2210/01
See application file for complete search history.

(56) References Cited

U.S. PATENT DOCUMENTS 5,379,950 A    1/1995 Kuster
6,354,013 B1 * 3/2002 Mucke ............... B21B 38/02
                                                          33/501.02
(Continued)

FOREIGN PATENT DOCUMENTS

DE    19819614 A1    11/1999
WO    2010/000816 A1    1/2010
WO    2014/195309 A1    12/2014

OTHER PUBLICATIONS

International Preliminary Report on Patentability dated Apr. 11, 2019 in International Application No. PCT/EP2017/071060.
(Continued)

Primary Examiner — Faye Francis
(74) Attorney, Agent, or Firm — Xsensus LLP

(57) ABSTRACT

A self-optimizing, adaptive product processing system and a corresponding method for grinding and/or crushing cereals and seeds. The grinding and/or crushing takes place in at least one roller mill which includes a roller pair. So as to detect the temperature of the surfaces of the rollers, at least two temperature sensors are disposed on at least one of the rollers. The detected temperature measurement values are used for optimal adjustment and signal generation of the roller setting.

13 Claims, 10 Drawing Sheets

Figure 1:
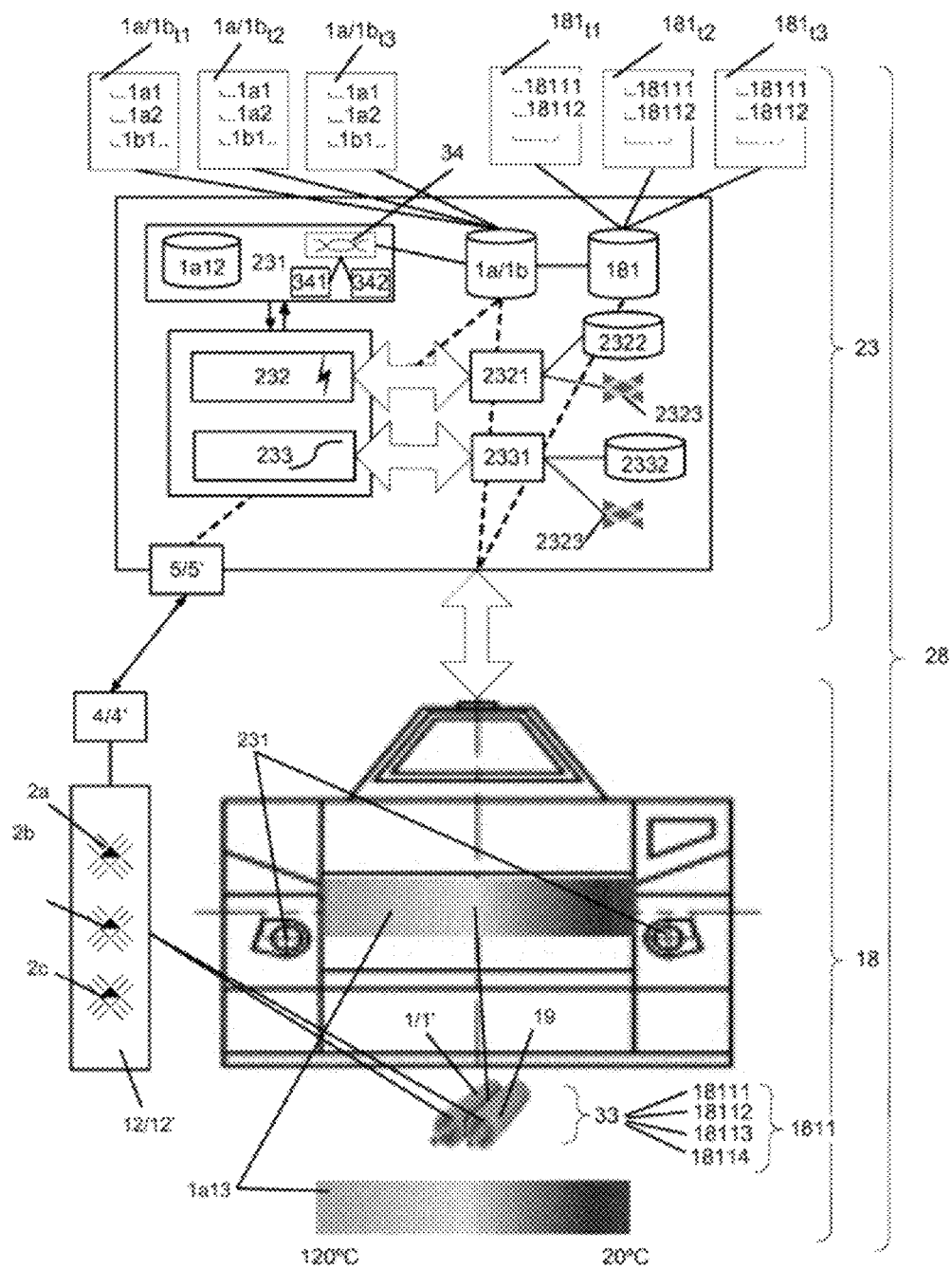

(51) Int. Cl.
  *B02C 4/30* (2006.01)
  *B02C 4/38* (2006.01)
  *B02C 4/06* (2006.01)
  *H02J 50/10* (2016.01)
  *G06N 20/00* (2019.01)
  *B02C 4/44* (2006.01)

(56) References Cited

U.S. PATENT DOCUMENTS

| | | | | |
|---|---|---|---|---|
| 7,172,144 B1* | 2/2007 | Slater | ................ | B02C 17/1805 241/101.2 |
| 7,185,537 B2* | 3/2007 | Muhs | ................ | D21F 3/04 73/159 |
| 7,572,214 B2* | 8/2009 | Gustafson | ................ | D21F 3/06 492/9 |
| 7,963,180 B2* | 6/2011 | Moore | ................ | G01L 5/0085 73/862.55 |
| 8,475,347 B2* | 7/2013 | Gustafson | ................ | D21G 1/02 492/10 |
| 2006/0090574 A1* | 5/2006 | Moore | ................ | G01L 5/047 73/862.55 |
| 2011/0101139 A1* | 5/2011 | Inoue | ................ | B02C 25/00 241/37 |
| 2014/0374460 A1* | 12/2014 | Breineder | ................ | D21F 3/06 226/45 |
| 2015/0253131 A1* | 9/2015 | Webster | ................ | B02C 4/02 241/101.3 |
| 2016/0107162 A1 | 4/2016 | Busenhart et al. | | |
| 2016/0243556 A1* | 8/2016 | Giesemann | ................ | B02C 23/08 |

OTHER PUBLICATIONS

International Search Report dated Nov. 9, 2017 for Application No. PCT/EP2017/071060, 7 pages (with English Translation).
Written Opinion of the International Searching Authority, dated Nov. 9, 2017 for Application No. PCT/EP2017/071060, 7 pages.

* cited by examiner

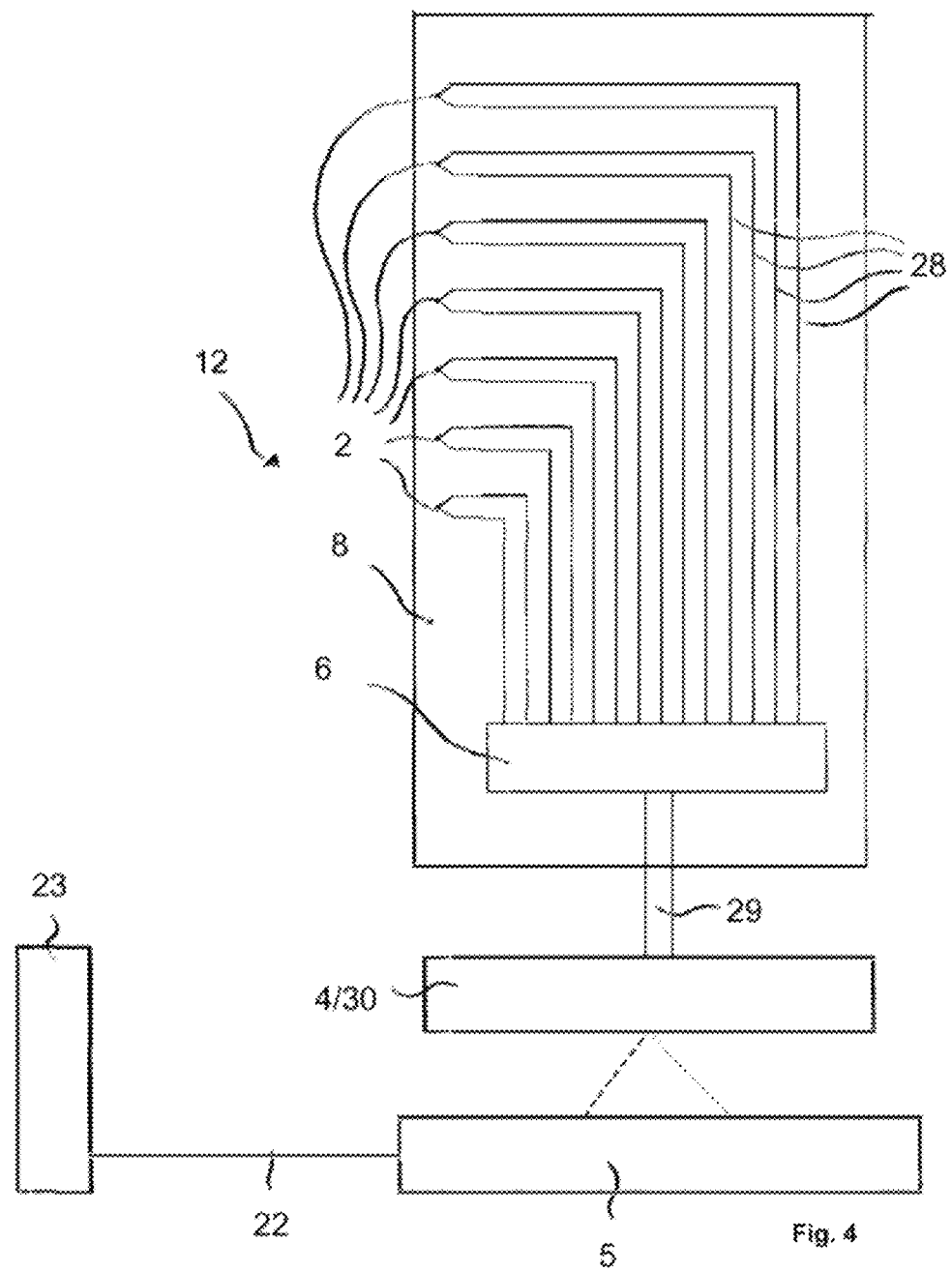

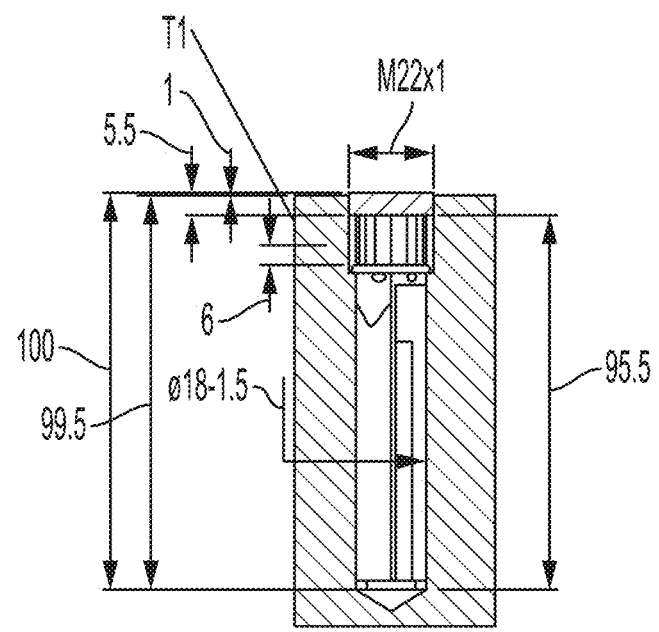
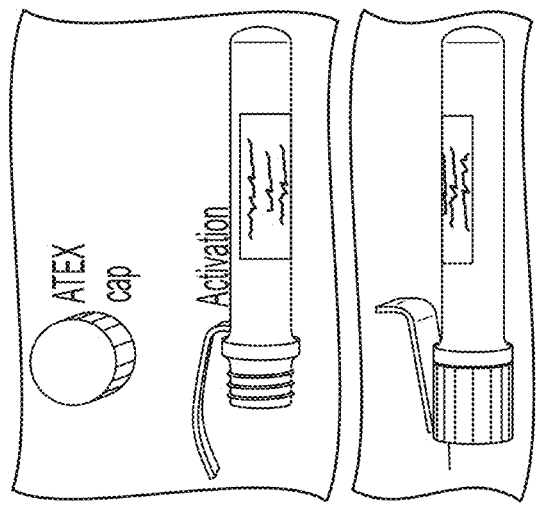
Fig. 8

MONITORING AND CONTROL DEVICE FOR THE AUTOMATED OPTIMIZATION OF THE GRINDING LINE OF A ROLLER SYSTEM AND CORRESPONDING METHOD

CROSS-REFERENCES TO RELATED APPLICATIONS

The present application is a continuation of PCT/EP2017/071060 filed Aug. 21, 2017, which claims priority to the Switzerland Patent Application 1075/16, filed Aug. 22, 2016, both of which are incorporated herein by reference.

FIELD

The present invention relates to monitoring and control systems for the automated optimization of grinding and milling systems, and in particular grinding and milling systems for grinding and/or crushing cereals and seeds or for processing, by comminution and homogenization, viscous material, and in particular chocolate masses, printing inks and the like. In particular, the present invention relates to milling systems comprising grinding roller pairs, measuring devices for the detachable insertion into a receiving opening of a roller body of a roller of a roller pair, and in particular of a grinding roller of a grinding roller pair, product processing systems, comprising at least one roller pair, and in particular grinding systems comprising at least one grinding roller pair, and to corresponding methods for the optimized operation of such grinding and milling systems or product processing systems.

BACKGROUND

Since the introduction of rollers running next to one another in pairs, the term 'high grinding' is essentially no longer justified. Nonetheless the term is still commonly used since, when using rollers, the grinding process, in keeping with the former position of the mill stones, starts on rollers that are spaced far apart from one another, and the subsequent crushing steps are carried out on incrementally more narrowly positioned rollers so as to yield the appropriate amounts of meal or ground product. Grinding rollers, such as those used in the milling of grain, for example, require constant monitoring. It is possible, for example, for what is known as dry running to occur on occasion, in which adjoining grinding rollers come in contact with one another, for example, and the driving power of the motor is converted into heat in an uncontrolled manner. If the described state is present for too long, the temperature of the grinding roller may rise to a critical range and potentially cause a fire or damage to the rollers. To prevent this, it is already known (see WO 2014/195309 A1, for example) to monitor the temperature of a grinding roller using one or more sensors, and to output a warning when a critical temperature has been reached. For this purpose, optical systems may be used for detecting the circumferential surface of the grinding roller. The problem with this approach, however, is that these optical or non-contact systems are located in the product space through which the material to be ground also flows. For this reason, such optical systems are extremely susceptible to soiling.

Additionally, endeavors are made in grinding systems to increasingly automate the monitoring and optimization of the mill, not only to lower costs, but also because untrained staff assumes, or has to assume, the task of supervising the grinding process to an ever greater degree. Typically, the granulation of the ground product or the temperature/temperature distribution of the rollers are checked manually by the miller during the milling of cereals and seeds. This means that, during the grinding process, the miller checks at regular intervals whether the rollers have a uniform temperature distribution. During the manual check, the miller runs his hands over the length of the rollers, checking whether the rollers have approximately the same temperature in the lateral regions and in the center. It is likewise known from the prior art (unexamined patent application DE 27 30 166) that disturbances occur or can occur repeatedly, which do not allow idealized milling conditions or deviate drastically therefrom. These disturbances include irregular roller temperatures, among other things. According to the aforementioned published prior art, it is proposed to dispose a temperature sensor on one side or both sides of at least one roller. According to this document, the temperature sensor is disposed in the region of the bearings in the bearing housing. This system, which forms part of the prior art, has the disadvantage that the temperature of the roller is determined with delay, both in terms of time and space, namely when the surface temperature of the roller has reached the bearings. Furthermore, it is known from DE 102 26 411 A1 to measure the temperature of the circumferential surface of a grinding roller in a non-contact manner using temperature sensors. Due to the distance between the sensor and the circumferential surface of the grinding roller, the actual temperature of the circumferential surface can, at times, deviate significantly from the measured temperature. These deviations then have to be considered in the evaluation based solely on empirical values, which is to say experience, which is cumbersome and also prone to errors. The associated calibration is therefore person-dependent. Moreover, DE 198 19 614 A1 also discloses temperature sensors disposed at a distance from the grinding rollers. Moreover, it is important to monitor roller wear. For this purpose, DE 42 22 085 A1 discloses devices for measuring the surface properties of a grinding roller. However, these devices are also disposed outside the circumferential surface of the grinding roller and therefore have the drawbacks that were already described above. In addition, devices and methods that can be used to measure the wear of corrugated rollers are known. However, these measurements can only be carried out when the grinding rollers are stopped. While this kind of measurement is precise, it always necessitates stopping the grinding system.

Furthermore, pressure sensors are known, by way of which the contact pressure between two adjoining grinding rollers can be measured. Finally, vibration sensors for grinding rollers are also known, for example from the document WO 2007/025395 A1. All of these sensors are typically disposed outside the grinding rollers. Finally, roller pairs are also known from WO 2014/195309 A1 for processing a product, which include two rollers, one or both rollers comprising at least one sensor. In this way, a sensor system inside the circumferential surface of the roller is achieved. The functionality integrated into the roller, however, is limited to the sensor system. A person skilled in the art would disregard all possible experiments involving a roller of a roller pair processing bulk material, material to be ground or masses which, in addition to a sensor, comprise a control unit—among other things, for example, due to the extreme force, pressure, temperature and dust conditions in the surroundings of the roller or the roller pair, and due to the corresponding conventional, predominantly manual procedures employed in the processing of bulk material.

SUMMARY

It is an object of the present invention to solve the disadvantages and technical problems known from the prior art. In particular, a self-optimizing control system and a method for grinding and/or crushing cereals and seeds are to be provided, by way of which the grinding and/or crushing can be carried out in an optimized and automated manner and which enhances the operating safety of a mill. The system is to provide a corresponding roller pair, and in particular a grinding roller pair, and a product processing system, and in particular a grinding system for grinding material to be ground, by way of which a state of at least one roller or both rollers of a roller pair, and in particular of at least one or both grinding rollers of a grinding roller pair, can be determined with greater accuracy and which additionally are less susceptible to soiling. In this way, the operating safety is to be enhanced at least in some embodiments, and the performance of a processing process, and in particular of a grinding process, is to be inferable therefrom. In particular, the system is to provide automated monitoring and control as to whether the rollers are positioned parallel to one another, and thus form the optimal grinding line since, in particular, multiple uses of such a system, for example in all grinding machines, can result in a considerable increase in grinding efficiency. Finally, it is an object of the invention to provide a device for machine learning, which is able to optimally and dynamically monitor and adapt the rollers pairs, without checking or setting detailed operating conditions manually.

DESCRIPTION

The invention will be described in more detail hereafter based on exemplary embodiments and drawings.

FIG. 1 schematically illustrates a self-optimizing, adaptive processing system 28 comprising a grinding system 18 including at least one roller pair 33. The roller pair 33 comprises two rollers 1/1', 19 for processing a product. At least one of the rollers 1/1' comprises one or more sensors 2/2' for detecting measurement values that characterize a state of the corresponding roller 1/1'. A measuring device 12/12' is inserted into a receiving opening 11/11' of the roller body 10/10' of the at least one roller 1/1' for the processing of the product. The measuring device 12/12' comprises at least one of the sensors 2/2' for detecting measurement values characterizing a state of the roller 1/1'. Using a data receiver 5/5' of a control unit 23 of the product processing system 28, measurement values from at least one roller 1/1' of the roller pair 33 are received from a data transmitter 4/4' of the measuring device 12/12' or transmitted by the data transmitter 4/4' to the data receiver 5/5'.

Figure 2:
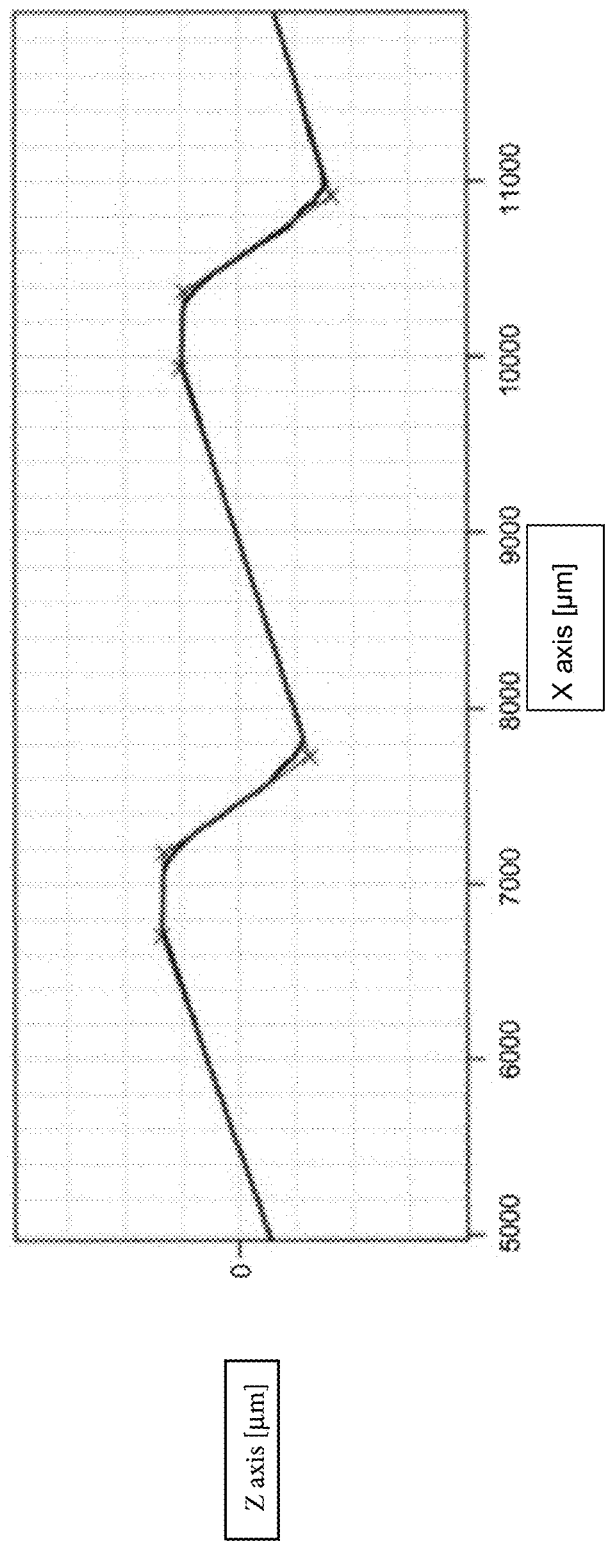

FIG. 2 schematically illustrates the identification of a corrugation type 1b2 of a roller 1/1' by way of measurement values 1a/1b of the roller 1/1'. With this, the surface structure of the roller 1/1' is indicated both in the x axis and in the y axis in µm.

Figure 3:
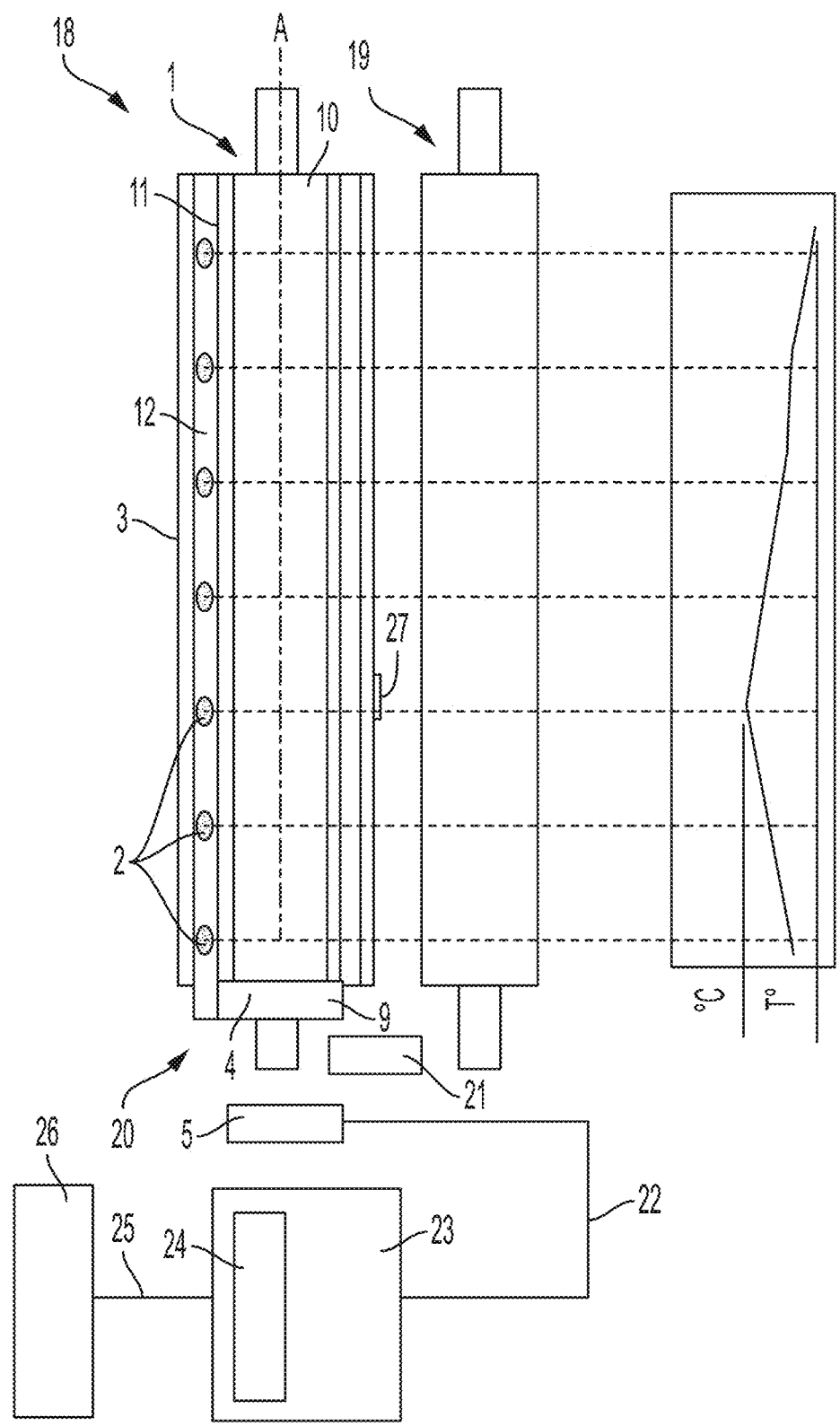

FIG. 3 schematically illustrates a representation of a first grinding system 18 comprising a grinding roller 1 and multiple temperature sensors 2. The product processing system in FIG. 1 is designed as a grinding system 18 for grinding material to be ground, and in particular for grinding grains. The grinding system 18 comprises a grinding roller pair made up of a first grinding roller 1 including seven temperature sensors 2 and a data transmitter 4, and a second grinding roller 19, which, however, does not necessarily have to include a sensor or a data transmitter. The first grinding roller 1 comprises a roller body 10 including a receiving opening 11 in the form of a cylindrical borehole, which extends parallel to a rotational axis A of the roller body 10 and along the entire length thereof. A rod-shaped measuring device 12, which comprises the seven temperature sensors 2, is inserted into the receiving opening 11. The measuring device 12 is potted in the receiving opening 11 and thereby inserted non-detachably in the receiving opening 11. The temperature sensors 2 allow measurement values to be detected, which characterize the temperature in various locations of a circumferential surface 3 of the grinding roller 1. The composition of the measuring device 12 is described in greater detail hereafter with reference to FIGS. 2 and 3a through 3d.

The measuring device 12 included in the grinding roller 1 according to FIG. 3 can be inserted, for example, in the receiving opening 11 in the form of a rod-shaped measuring device 12, which includes the temperature sensors 2. The printed circuit board 9 can include the multiplexer 6. The cable 29 can exit at one end of the measuring device 12. At the end of this cable 29, a connector 30 can be provided, by way of which the measuring device 12 can be connected to the data transmitter 4. The temperature sensors 2 can be of the known type PT 1000 or the like, for example.

FIG. 4 schematically shows of a further representation of the grinding system 18 according to FIG. 3.

Figure 5A:
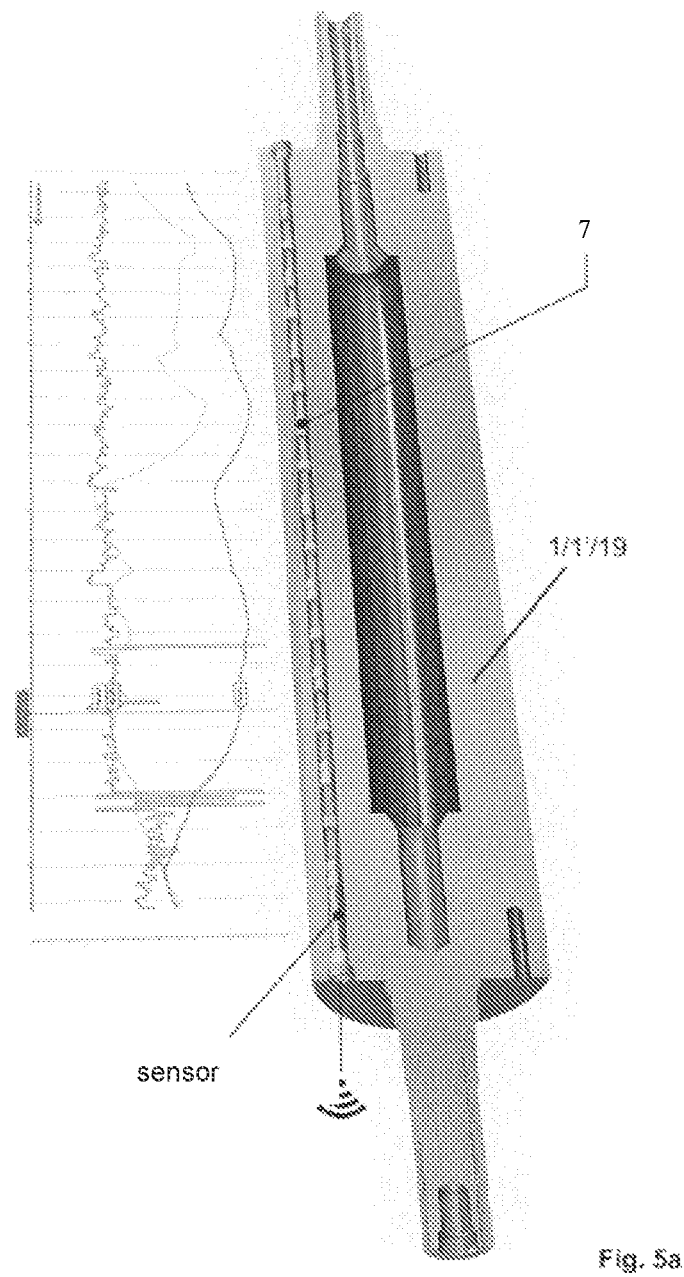
Figure 5B:
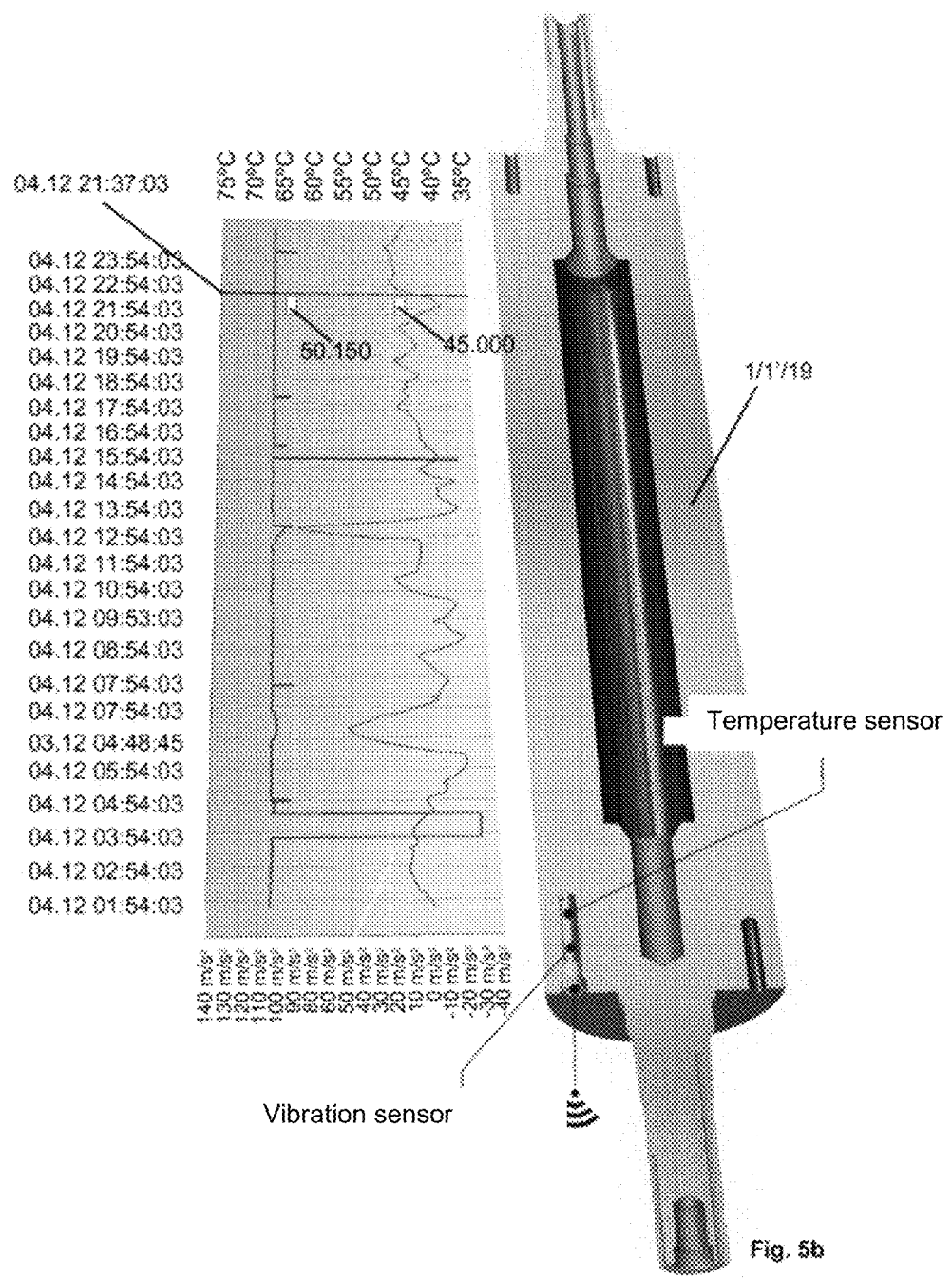

FIGS. 5a and 5b show two possible variant embodiments of the integration of the sensors 2/2' into one or both rollers 1/1'/19 of the roller pair 33. In FIG. 5a, the sensors 2/2' are integrated into a continuous receiving opening of the rollers 1/1'/19 (iRoll method), while in FIG. 5b they are integrated as plugs at the distal ends of the rollers 1/1'/19 (iPlug method). In FIG. 5a (iRoll), the temperature measurement can be carried out, for example, every 121 mm by way of the sensors 2a across the entire length of the roller 1/1'/19. In the iPlug method according to FIG. 5b, the temperature measurement takes place either one side or both sides of the roller 1/1'/19, for example, once by way of a sensor 2a. In FIGS. 5a and 5b, the acceleration measurement can take place by way of an accelerometer 2c (for example, 3-axis acceleration measurement). The data transmission or the corresponding data link can be achieved, for example, via an integrated Bluetooth Low Energy device to IxB cube per grinding system 18/18'. In FIG. 5a, the yellow/purple curve shows the temperature pattern in ° C. (x axis, vertical, based on the example of two temperature sensors yellow/purple) of the rollers as a function of the measuring times (y axis horizontal), while the green curve indicates the measured acceleration/vibration in m/s$^2$ (x axis, vertical, in this example the 3-axis acceleration measurement has been combined into a vibration value) of the rollers as a function of the measuring times (y axis horizontal). In FIG. 5b, the purple curve shows the temperature pattern in OC (x axis, vertical) of the rollers as a function of the measuring times (y axis horizontal), while the green curve indicates the measured acceleration in m/s$^2$ (x axis, vertical, in this example the 3-axis acceleration measurement has been combined into a vibration value) of the rollers as a function of the measuring times (y axis horizontal).

Figure 6:
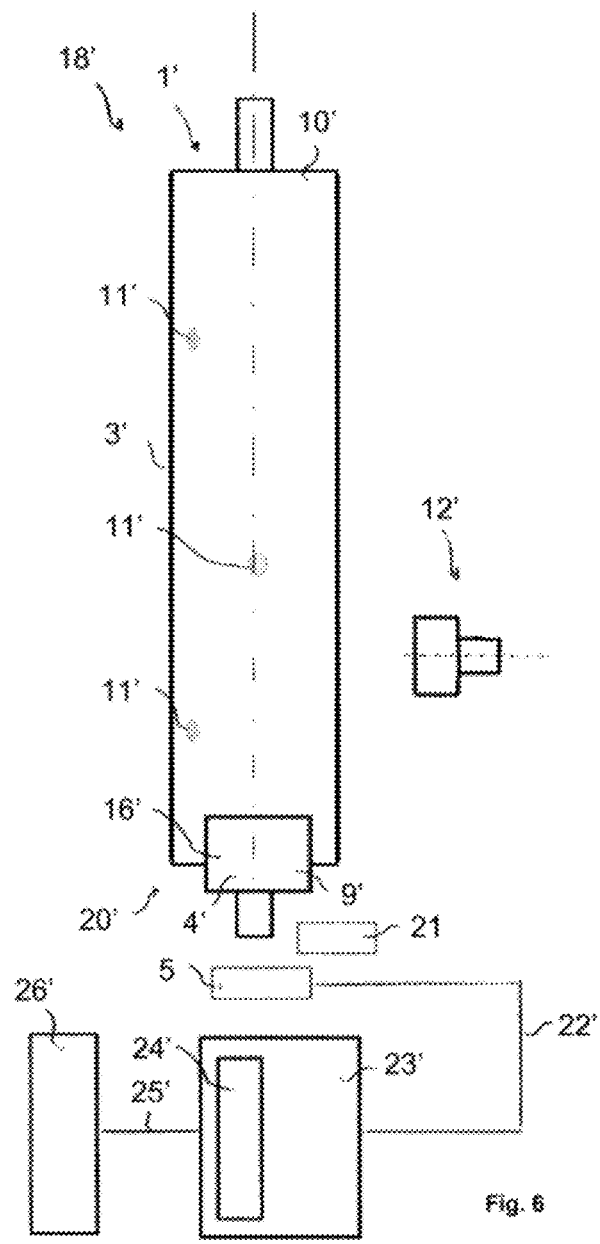

FIG. 6 shows a second exemplary embodiment according to the invention of the production system comprising a grinding system 18' and a grinding roller 1 including multiple pressure sensors. The system is designed as a grinding system 18 for grinding material to be ground, and in particular grains. So as to simplify the illustration, only one grinding roller 1' of a roller pair is shown here, but not an additional grinding roller 19 as in FIG. 3. Multiple receiving openings 11' are present in a circumferential surface 3' of a roller body 10' of the grinding roller 1', of which only 3 are shown here. These receiving openings 11' extend in the radial direction of the roller body 10', which is to say perpendicularly to a rotational axis A' of the roller body 10'. FIG. 6 furthermore shows a bolt 12' (not true to scale), which represents a measuring device. This bolt 12' includes a thread, which is not shown in the figure. Each of the receiving openings 11' includes a mating thread, which is likewise not shown and into which the bolt 12' can be screwed. The bolt 12' furthermore comprises a sensor 2/2' and a data transmitter 4/4', neither of which is shown in FIG. 6. For example, the sensor 2/2' can be a wear sensor 2f, a pressure sensor 2d, a temperature sensor 2a, a vibration sensor 2b, an acceleration sensor/accelerometer 2c, a force sensor 2e or a deformation sensor 2g, and the like. A data transmitter 4', an energy receiver 9' and a data receiver 16' are disposed on an end face 20' of the grinding roller 1'. In this way, the measurement data detected by the sensor 2' can be transmitted from the data transmitter of the bolt 12' to the data receiver 16' of the roller boy 1' in a non-contact manner, for example by way of infrared radiation, by light pulses, by radio frequency signals, by inductive coupling or by any arbitrary combination thereof. This preferably takes place through an interior space, and in particular a cavity of the roller body 10'. The bolt 12' can be supplied with energy inductively and/or by way of light. As an alternative or in addition, it can comprise at least one piezo element, by way of which electrical energy can be generated from the forces that develop during rotation of the grinding roller 1'. Likewise, as an alternative or in addition, the bolt 12' can comprise at least one battery, and in particular a rechargeable battery.

Figure 7:
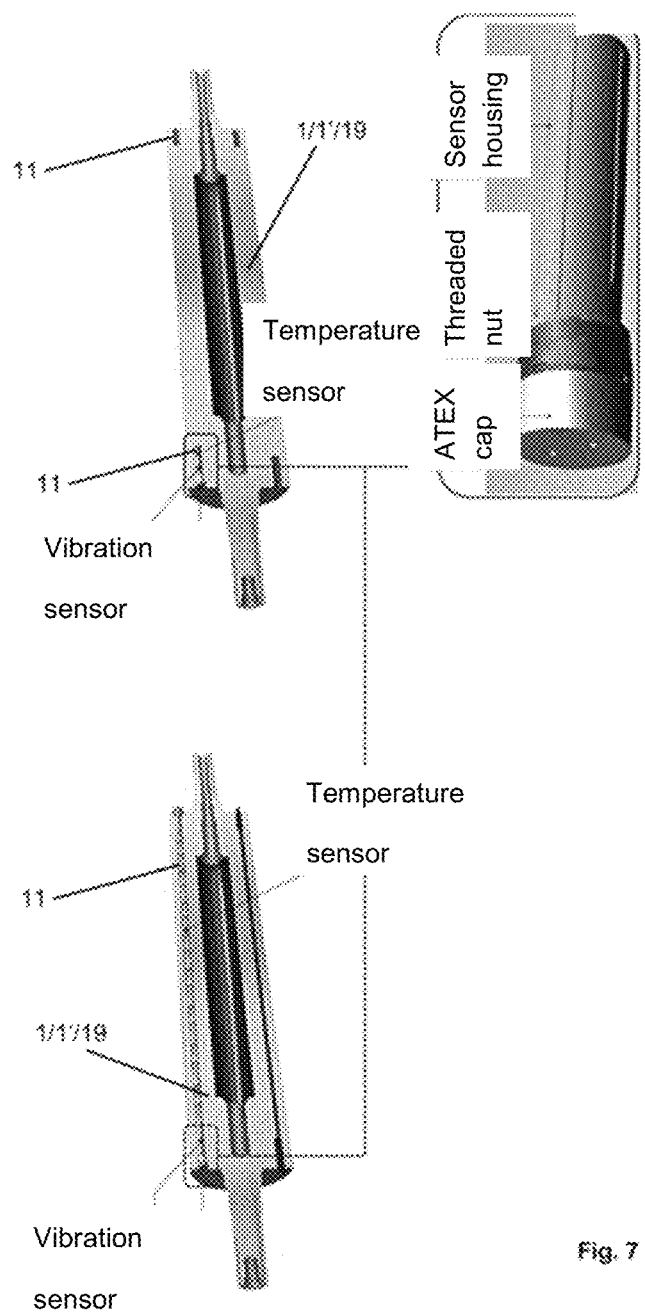

FIG. 7 schematically shows that the measuring device can be inserted detachably or non-detachably in the receiving opening, for example. If the measuring device is inserted detachably in the receiving opening, it can be easily replaced, for example if it needs to be cleaned or serviced or is defective. If the measuring device is inserted non-detachably in the receiving opening, the measuring device can, in this way, be connected more securely to the roller body. Moreover, unauthorized removal of the measuring device can be prevented, which could impair safety. The measuring device can be potted (such as by way of a resin) or welded into the receiving opening, for example. This also allows the risk of explosions to be avoided, whereby in particular the ATEX Directive of the European Union can be met.

FIG. 8 schematically shows the integration of the sensors 2/2' in the case of the iPlug method according to FIG. 5b in greater detail. The temperature measurement takes place either on one or both distal sides of the 1/1'/19, for example, once by way of a sensor 2a. The measuring device 12/12' is inserted in the corresponding opening 11/11' in the plug method. The shown ATEX cap is used to close the measuring device 12/12' comprising the sensors 2/2'.

Figure 9:
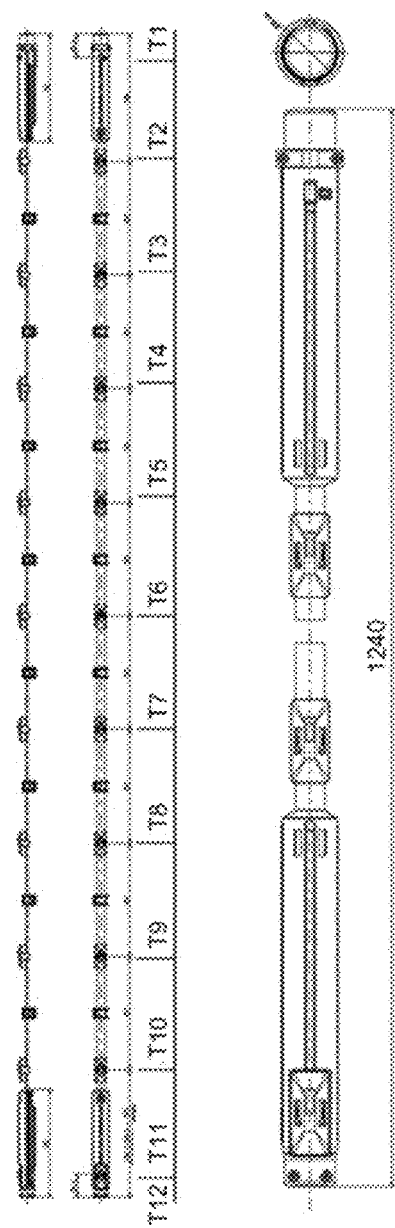

FIG. 9 schematically shows the integration of the sensors 2/2' in the case of the iRoll method according to FIG. 5 in greater detail, wherein the sensors 2/2' are integrated in a continuous receiving opening of the rollers 1/1'/19. The temperature measurements T1 to T12 can be carried out, for example, every 121 mm by way of the sensors 2a across the entire length of the roller 1/1'/19.

FIG. 1 shows the entire self-optimized, adaptive product processing system 28 comprising the grinding system 18.

The grinding system 18 comprises at least one roller pair 33, wherein the roller pair 33 comprises two rollers 1/1', 19 for processing a product or material to be ground, such as wheat or coffee beans. At least one of the rollers 1/1' comprises at least one sensor 2/2' for detecting measurement values 1a/1b/181, which characterize or measurably define a state of at least one roller 1/1'. A measuring device 12/12' is inserted into a receiving opening 11/11' of a roller body 10/10' of the at least one roller 1/1' of the roller pair 33 for the processing of a product, wherein the measuring device 12/12' comprises at least one of the sensors 2/2' for detecting measurement values 1a/1b/181 characterizing a state of the roller 1/1'. At least one of the rollers 1/1' of the roller pair can, for example, comprise at least one temperature sensor 2a for measuring the roller temperature 1a1 and/or a vibration sensor 2b for vibration detection 1a2 and/or an accelerometer 2c for monitoring a rotational speed 18112 and/or accelerations/decelerations 1a3 of the roller 1/1'. In one variant embodiment, at least one roller 1/1' can comprise the data transmitter 4/4', a microprocessor 31, an energy store 32, a temperature sensor 2a and a vibration sensor 2b. The energy store 32 is used to supply power to the data transmitter 4/4' and/or the sensors 2/2'. Furthermore, at least one roller 1/1' can comprise a measuring device 12/12' including a temperature sensor 2a in the region of each of the distal ends thereof, which is to say at least two, wherein a temperature gradient for the roller 1/1' can be measured by way of the at least two temperature sensors 2a of the respective distal ends. The control unit 23 can be implemented in such a way, for example, that the roller temperature 1a1 is measured and monitored continuously on the at least one sensor 2a, allowing real-time control and/or dynamic real-time optimization, for example by way of a machine learning unit 34. The roller 1/1' can comprise an RFID tag 31, a temperature sensor 2a, an acceleration sensor 2c and a vibration 2b, for example, wherein the control unit 23, based on the measurement data 1a/1b/181 of the sensors 2/2', generates parameters regarding the remaining service life 1a4 of the roller 1/1' and/or wear parameters 1a5 and/or operating parameters 18 and/or regarding the speed 18112 and/or accelerations/decelerations 1a3 of the roller 1/1' and/or the roller shape 1a6 and/or swirl 1a7 and/or number of corrugations 1a8 of the roller 1/1'. The wear parameters 1a5 and/or operating parameters 181 can comprise diagnostic indicators for product build-up 18113 or other mechanical changes of the roller 1/1'.

Using a data receiver 5/5' of a control unit 23 of the product processing system 28, measurement values from at least one roller 1/1' of the roller pair 33 are received from a data transmitter 4/4' of the measuring device 12/12' or transmitted by the data transmitter 4/4'. For example, using the at least one temperature sensor 2a, the control unit 23 is able to measure a temperature gradient 1a13 along the roller 1/1', which is transmitted to the control unit 23 (for example, also in the form of at least two temperature values), wherein the distance and/or parallelism of the roller pair 1/1' is automatically corrected, optimized and adapted by way of the control device 23 based on the measured temperature gradient 1a1.

The roller operation and the width of the gap 18111 between the two rollers 1/1', 19 of the roller pair 33 and/or the parallelism 18114 of the rollers 1/1', 19 are optimized in an automated and self-controlled manner by the control unit 23 and/or a closed-loop control unit 231 connected to the control unit 23 based on the received measurement values. Furthermore, the control unit 23 can unambiguously identify the roller 1/1', for example by way of RFID 1b or other identification means 1*b* provided on the roller 1/1', based on electronically stored data of the identification means 1*b*, wherein at least the roller number 1*b*1 and/or corrugation identification 1*b*2 are assigned to an identification of the roller 1/1'. So as to generate and predict the remaining service life 1*a*4 of the roller 1/1' and/or the wear parameters 1*a*5 and/or the operating parameters 181, the control unit 23 can comprise a machine learning unit 34, by way of which the operation and maintenance can be optimized in a self-adaptive manner at least in terms of the shape 1*a*6 and/or twist 1*a*7 and/or number of corrugations 1*a*8 of the roller 1/1' through the generation of signals to the closed loop control unit 231. The optimization of the operation of the roller pair 33 and/or of the parallelism 18114 of the rollers 1/1', 19 can be carried out, for example, by the control unit 23 and/or a closed-loop control unit 231 connected to the control unit 23, based on the received measurement values 1*a*/1*b*/181, by way of a machine learning unit 34, wherein the machine learning unit 34 comprises a monitoring unit 341 for monitoring the received measurement values and a learning unit 342, and wherein the monitoring unit 341 chronologically detects the temperature 1*a*1 during the time $t_1, t_2, t_3, \ldots$ (for example, also in the form of a temperature change, which is to say heating or cooling) with an actual value 1*a*11 and a setpoint value 1*a*12 of the temperature 1*a*1, gap width 18111 and/or speed 18112 and/or product build-up 18113 and/or parallelism of the roller 18114, and the learning unit 342 carries out the learning process by linking the actual value 1*a*11 and the setpoint value 1*a*12 of the temperature ala, in particular during a temperature change, such as heating, gap width 18111 and/or speed 18112 and/or product build-up 18113 and/or parallelism of the roller 18114. For example, using the data receiver 5/5' of the product processing system 28, it is possible to receive measurement values transmitted from the data transmitter with at least one roller 1/1' of the roller pair 33, wherein the operation of the product processing system 28, based on the transmitted measurement values, is optimized by way of a self-learning structure of the machine learning unit 34, at least with respect to the shape 1*a*6 and/or twist 1*a*7 and/or number of corrugations 1*a*8 of the roller 1/1'. The closed-loop control unit 231 connected to the control unit 23 can, in particular, comprise an alarm device 232 and/or a shut-down device 233, for example. When corresponding alarm trigger parameters 2322 and/or shut-down trigger parameters 2332 are triggered, a corresponding alarm can be output or signaled by way of an alarm switch 2323, or a shut-down of the grinding system 18/19' by way of a shut-down switch 2333 can be initiated, with the aid the alarm trigger 2321 or the shut-down trigger 2331 in the measurement values or parameters 1*a*/1*b*/181. This can take place, in particular, when a corresponding deviation of the actual value 1*a*1 of the roller temperature 1*a* is triggered by way of the alarm trigger 2321 or the shut-down trigger 2331. The triggering can take place, in particular, dynamically in real time, for example.

As is shown in FIG. 1, the control device 23 furthermore comprises the unit for machine learning 34. The unit for machine learning 34 can be an external device for the control device 23. In this case, the unit for machine learning 34 is bidirectionally connected to the control device 23 and the closed-loop control unit 231 so as to communicate with one another. As is shown in FIG. 1, the unit for machine learning 34 comprises a monitoring unit or a state observation unit 341 for observing a state variable and measurement values 1*a*/1*b*/181 comprising the temperature during the time $t_1, t_2, t_3 \ldots$ and an actual value 1*a*11, the gap width 18111 and/or speed 18112 and/or parallelism of the roller 18114. The monitoring unit 34 can consecutively store each state parameter together with a time $t_1, t_2, t_3$ at which the state parameters are being monitored (memory units with the values 1*a*12, 1*a*/1*b*/181). The unit for machine learning 34 can furthermore comprise a learning unit 342 for carrying out a learning process by linking at least one of the actual values 1*a*11 or setpoint values 1*a*12 of the temperature 1*a*1 during the time $t_1, t_2, t_3 \ldots$ and the gap width 18111 and/or speed 18112 and/or product build-up 18113 and/or parallelism of the roller 18114, which are detected by the monitoring unit 341. The learning unit 342 can be implemented for a number of types of machine learning, such as supervised learning, unsupervised learning, partially supervised learning, reinforcement learning, transductive learning, multi-task learning, and the like. As an exemplary embodiment, the learning unit 342 carries out reinforcement learning by way of Q-learning. However, this shall expressly only be understood as an exemplary embodiment. In this example, the unit for machine learning 34 corresponds to an agent in reinforcement learning. As is shown in FIG. 1, the measurement values and parameters 1*a*/1*b*/181 are detected and assigned by the monitoring unit 341 based on the temporal dependency $t_1, t_2, t_3 \ldots$ thereof. The learning unit 341 for carrying out the reinforcement learning comprises a reward calculation unit for calculating a reward based on at least one of the measurement values and an assigned temperature 1*a*1 (during the measured time (actual value 1*a*11) and a setpoint value 1*a*12), which is monitored by the monitoring unit 342, and a function updating unit (artificial intelligence) for updating a function, such as an action value function (action value table) for deciding on and selecting from the present measurement values and (operating) parameters 1*a*/1*b*/181, based on the reward calculated by the reward calculation unit, and/or at least one of a setpoint value of the temperature 1*a*1 during the times $t_1, t_2, t_3 \ldots$ and/or the gap width 18111 and/or speed 18112 and/or diagnostic indicator for product build-up 18113 and/or parallelism 18114 of the rollers 1/1'. The function updating unit can, of course, also update other functions. The unit for machine learning 34 furthermore comprises a decision-making unit for deciding on the optimal value of at least one setpoint value of the time from the present measurement values and (operating) parameters 1*a*/1*b*/181, based on the result of the learning of the learning unit 34. The decision-making unit 342 learns the selection of a better action (decision-making). It is noted that the decision-making unit can be included in the control device 23, and not in the unit for machine learning 34. In terms of the starting situation, the unit for machine learning 34 can select at least one setpoint value, for example of the temperature 1*a*1, or multiple setpoint values, for example temperature 1*a*1, gap width 18111, speed 18112 or parallelism 18114 and issue instructions therefor. These setpoint values are randomly selected from the respective predetermined ranges thereof. As an alternative, it is possible, for example, to initially select the minimum value in the predetermined range, which is to say the temperature range, as the setpoint value, wherein this value is then increased by a very small amount in the subsequent cycle. The same applies to other possible setpoint values. The processes can be repeated, so that all combinations of a setpoint value, such as of the temperature ala, of the temperature gradient or the time can be selected.

So as to achieve the temperature control by which the roller temperature can be controlled with higher accuracy for a particular material to be ground, the above-described control can additionally be optimized by calibration using a transformation heating model. For example, a separate cooling model of the roller/roller pair and/or of the material to be ground can be implemented by individual learning of the aforementioned transformation heating model. With this additional optimization, the roller temperature can at least initially be controlled by way of an adapted gap width so as to agree with the prescribed setpoint temperature value, while the magnitude of the transformation heating is compensated for by predicting the extent. Heat absorption or transformation by the roller and/or material to be ground can then be achieved, for, by way of a transformation heating model-based learning unit for learning the transformation heating model, wherein the transformation heating model learning unit generates a prediction of the extent of the transformation heat. The transformation heating model-based learning unit can be implemented as part of the machine learning unit 34 or of the learning unit 342, for example.

A variety of embodiments are conceivable for implementing the control device 23 together with the unit for machine learning 34. In principle, any grinding system 18/18' can be implemented together with a control device 23 and a unit for machine learning 34. In this case, the grinding system 18/18' functions completely self-sufficiently and has the self-optimization and adaptivity implemented on-site by on-board means. The control device 23, however, can also be connected bidirectionally to a central master unit, for example via a data transmission network. In this case, the control device 23 transmits the measurement data thereof to the central master unit, which comprises the unit for machine learning 34. After the unit for machine learning 34 has carried out the optimization process, the central master unit can transmit, for example, the necessary control parameters, such as the roller distance and/or rotational speed and/or roller pressure, to the control device 23 of the grinding system 18/18', which then assumes control of the grinding process remotely. Finally, it is also possible, in one variant embodiment, for different operating/operation adaptation profiles to be generated by way of a central master unit, which comprises the unit for machine learning 34, in advance and as a function of the roller identification and/or the technical roller profile/parameter and/or a certain gap width and/or a certain material to be ground, and to be stored. Such operation adaptation profiles can then be stored in advance in the grinding system 18/18' or the control device 23 of the grinding system 18/18', for example. In this case, the measurement of certain measurement parameters in the grinding system 18/18' or the measuring device 12/12' is triggered by the dynamic selection of the corresponding operation adaptation profile, based on which the control device 23 dynamically and self-adaptively regulates the operation of the grinding system 18/18', and in particular automatically regulates the gap width of the roller pair and/or the rotational speed and/or the roller pressure.

The grinding roller 1, 1' can comprise at least one sensor 2, 2', and preferably multiple sensors 2, 2', for detecting measurement values characterizing a state of the grinding roller 1, 1', and in particular the state of a circumferential surface 3, 3' of the grinding roller 1, 1'. The grinding roller 1, 1' can comprise at least one data transmitter 4, 4', and preferably a single data transmitter 4, 4', for the non-contact transmission of the measurement values of the at least one sensor 2, 2' to a data receiver 5, 5'. Furthermore, the grinding roller 1, 1' can be designed according to the aforementioned feature combination and comprise at least one multiplexer 6, 6', which is disposed and designed to alternately transmit the measurement values detected by the sensors 2, 2' to the data transmitter 4, 4'. The grinding roller 1, 1' can furthermore comprise at least one signal converter 7, 7', and in particular at least one A/D converter 7, 7' for converting the measurement values detected by the sensor 2, 2'. The grinding roller 1, 1' can furthermore comprise at least one energy receiver 9, 9', in particular including an energy store, for supplying power to the sensor 2, 2' and/or to at least one multiplexer 6, 6' and/or to at least one signal converter 7, 7' and/or to the data transmitter 4, 4' of the grinding roller 1, 1' and/or to the data transmitter of a measuring device 12, 12', and in particular at least one inductive energy receiver 9, 9'. For inductive energy transmission, appropriate methods from the prior art can be employed, for example, by wirelessly transmitting electrical energy from a transmitter to the energy receiver 9, 9' in the roller via an electromagnetic field. The transmitter can be implemented as part of the grinding system 18, 18', for example. Using today's technology, this can be implemented in such a way that no heat has to be generated or no cables have to be pulled in the process, so that neither the roller has to be removed, for example for the replacement a corresponding battery, nor the grinding system 18/18' has to be stopped for charging the energy store of the energy receiver 9, 9', for example by way of cables, so as to supply the sensor 2, 2' with power. The grinding roller 1, 1' can furthermore comprise at least one printed circuit board 8, 8', on which the sensor 2, 2' and/or at least one multiplexer 6, 6' and/or at least one signal converter 7, 7' and/or at least one data transmitter 4, 4' of the grinding roller 1, 1' and/or at least one energy receiver 9, 9' are disposed. The grinding roller 1, 1' can furthermore comprise a roller body 10, 10' including at least one receiving opening 11, 11' and at least one measuring device 12, 12', which is inserted, in particular detachably or non-detachably, in the receiving opening 11, 11', wherein the measuring device 12, 12' comprises at least one of the sensors 2, 2'. The receiving opening 11' of the grinding roller 1' can be formed in a circumferential surface 3' of the roller body 10'. In the two latter exemplary embodiments of the grinding roller 1', the measuring device 12' can be designed as a bolt 12' including a thread 13', and the receiving opening 11' can include a mating thread 14', in which the thread 13' of the bolt 12' can be screwed or inserted in another manner. The aforementioned measuring device 12' of the grinding roller 1, 1' can furthermore comprise at least one data transmitter, and the roller body 10' can comprise at least one data receiver 16', which are designed and disposed in such a way that the measurement data detected by the sensor 2' can be transmitted in a non-contact manner from the data transmitter of the measuring device 12' to the data receiver 16' of the roller body 10', in particular through an interior space 17' of the roller body 10', and in particular through a cavity 17' of the roller body 10'. The aforementioned measuring device 12, 12' of the grinding roller 1, 1' can furthermore comprise at least one printed circuit board 8, 8', on which at least one sensor 2, 2' and/or at least one multiplexer 6, 6' and/or at least one signal converter 7, 7' are disposed. At least one sensor 2, 2' of the grinding roller 1, 1' can, for example, be designed as a temperature sensor $2a$ and/or at least one sensor 2, 2' can be designed as a pressure sensor $2a$ and/or at least one sensor 2, 2' can be designed as a force sensor $2e$ and/or at least one sensor 2, 2' can be designed as a wear sensor $2f$ and/or at least one sensor 2, 2' can be designed as a vibration sensor $2b$ and/or at least one sensor 2, 2' can be designed as a deformation sensor $2g$ and/or at least one sensor 2, 2' can be designed as an accelerometer/acceleration sensor $2c$.

The measuring device 12', in particular for the detachable insertion into a receiving opening 11' of a roller body 10' of a grinding roller 1', and in particular an above-described grinding roller 1', wherein the measuring device 12' comprises at least one sensor 2' for detecting measurement values and that characterize a state of the grinding roller 1', and in particular a state of a circumferential surface 3' of the grinding roller 1', and at least one data transmitter for the non-contact transmission of the measurement values to a data receiver 5', 16'. The grinding system 18, 18' can comprise at least one of the above-described grinding rollers 1, 1' and at least one data receiver 5, 5' for receiving the measurement values transmitted from the data transmitter 4, 4' of the grinding roller 1, 1'. The method for operating an above-described grinding system 18, 18' can comprise at least one step, for example, in which measurement values transmitted from a data transmitter 4, 4' of the grinding roller 1, 1' are received using the data receiver 5, 5' of the grinding system 18, 18'. A method for retrofitting and/or equipping a roller body 10, 10' with at least one receiving opening 11, 11' for a measuring device 12, 12' can comprise at least one step, for example, in which a measuring device 12, 12', and in particular an above-described measuring device 12, 12', is inserted into the receiving opening 11, 11', yielding a grinding roller 1, 1' having the features as described above.

"Product" within the meaning of the present invention shall be understood to mean bulk material or a mass. "Bulk material" within the meaning of the present invention shall be understood to mean a powdery, granular or pellet-shaped product, which is used in the bulk goods processing industry, which is to say in the processing of grains, milled grain products and grain end products of the milling operation (in particular milling of soft wheat, durum, rye, corn and/or barley) or special milling operation (in particular husks and/or milling of soy, buckwheat, barley, spelt, millet/sorghum, pseudocereals and/or legumes), the production of feed for livestock and pets, fish and crustaceans, the processing of oil seeds, the processing of biomass and production of energy pellets, industrial malting and crushing systems, the processing of cacao beans, nuts and coffee beans, and the production of fertilizers used in the pharmaceutical industry or in the solids chemicals industry. "Mass" within the meaning of the present invention shall be understood to mean a food mass, such as a chocolate mass or a sugar mass, or a printing ink, a coating, an electronic material or a chemical, and in particular a fine chemical.

"Processing a product" within the meaning of the present invention shall be understood to mean the following: (i) grinding, comminuting and/or flaking bulk material, in particular grains, milled grain products and grain end products of the milling operation or special milling operation as described above, for which purpose, for example, the pairs of grinding rollers or flaking rollers, which will be described in greater detail hereafter, can be used as roller pairs; (ii) refining masses, and in particular food masses, such as chocolate masses or sugar masses, for which pairs of roller refiners can be used, for example; and (iii) wet grinding and/or dispersing, in particular of printing inks, coatings, electronic materials or chemicals, and in particular fine chemicals.

Grinding rollers within the meaning of the present invention are designed to grind granular product to be ground, which is typically guided between a grinding roller pair comprising two grinding rollers. Grinding rollers, and in particular the grinding rollers of the grinding roller pairs according to the invention, usually have a substantially inelastic surface (in particular on the circumferential surface thereof), which for this purpose can include or consist of metal, for example, such as steel, and in particular stainless steel. Usually, a relatively fixed, and frequently manually or automatically controlled, nip is present between the grinding rollers of the grinding roller pair. In many grinding systems, the material to be ground is guided essentially in a vertically downward manner through such a nip. Moreover, in many grinding systems the material to be ground is fed to the grinding rollers of a grinding roller pair by virtue of gravity, wherein this feeding can optionally be pneumatically supported. The material to be ground is usually granular and moves through the nip in the form of a fluid flow. These characteristics distinguish a grinding roller (and in particular a grinding roller of a grinding roller pair according to the invention) and at least one grinding system comprising such a grinding roller from many rollers, for example, which are typically used to transport paper.

At least one of the two rollers, which is to say one or both rollers of the grinding roller pair, and in particular at least one or both grinding rollers of the grinding roller pair, can be designed as smooth rollers or as corrugated rollers or as roller base bodies having plates screwed thereon. Smooth rollers can be cylindrical or cambered.

Corrugated rollers can have a variety of corrugation geometries, such as roof-shaped or trapezoidal corrugation geometries and/or can comprise segments attached to the circumferential surface. At least one roller, in particular both rollers of the grinding roller pair, in particular at least one grinding roller, and in particular both grinding rollers of the grinding roller pair, can have a length in the range of 500 mm to 2500 mm and a diameter in the range of 250 mm to 800 mm.

The circumferential surface of the roller, and in particular of the grinding roller, can preferably be non-detachably joined to the roller body, and in particular can be designed in one piece therewith. This allows simple production and reliable and robust processing, in particular milling, of the product.

The at least one sensor is designed to detect measurement values that characterize a state of at least one of the rollers, and in particular of both rollers of the roller pair. In particular, this may be a state of a circumferential surface of at least one of the rollers, and in particular of both rollers of the roller pair. For example, the state can be a temperature, a pressure, a force (force component(s) in one or more directions), wear, a vibration, a deformation (expansion and/or deflection travel), a rotational speed, a rotational acceleration, ambient moisture, a position or an orientation of at least one of the rollers, and in particular of both rollers of the roller pair.

In contrast to the majority of the prior art, at least one roller of the roller pair, and in particular at least one grinding roller of the grinding roller pair, itself comprises at least one sensor. As the roller rotates during operation, the sensor follows the rotation. In particular, the at least one sensor is disposed within a circumferential surface of the roller. The at least one sensor is therefore not located in the product space through which the product, and in particular the material to be ground, also flows. A product processing system comprising at least one such roller, and in particular a grinding system comprising at least one such grinding roller, is therefore significantly less susceptible to soiling. Moreover, the measurement can take place directly in the roller, which makes the measurement considerably more precise. The sensor can be designed as a microelectromechanical systems (MEMS) sensor, for example.

The sensor preferably has a data link to at least one data transmitter, wherein the data transmitter is designed for the non-contact transmission of the measurement values of the at least one sensor to a data receiver.

The measurement values can be transmitted in a non-contact manner by way of the at least one data transmitter to a data receiver, which is not an integral part of the roller. In particular, this may be a static data receiver in relation to which the at least one sensor is moved during rotation of the roller. Due to the non-contact transmission, complex rotary feedthroughs for cables can be avoided, which otherwise used to be necessary. Preferably, however, the data transmitter can also be disposed on or in the same roller as the sensor having a data link thereto.

At least one of the two or both rollers can include one or more sensors as described above, for example four or six sensors. Furthermore, one or more sensors can have a data link to at least one data sensor. The sensors can be disposed in various positions along a rotational axis of the roller and/or at various angles about this rotational axis. The more sensors the roller comprises, and the more uniformly these are distributed, the more precisely the measurements can be conducted. Preferably, the sensors can be uniformly disposed in the circumferential direction, yielding a rotational equilibrium.

The sensors can comprise (i) at least one temperature sensor, but preferably multiple temperature sensors, which are disposed along a rotational axis of the roller to ascertain a temperature profile along this direction; (ii) one or more pressure sensors; (iii) one or more force sensors (for determining the force component(s) in one or more directions); one or more wear sensors; (iv) one or more vibration sensors, in particular for ascertaining a product build-up, which is to say an adherence of the processed product to the circumferential surface of the roller, which impedes processing, and in particular grinding, in this position; (v) one or more deformation sensors (for determining an expansion and/or deflection travel); (vi) one or more speed sensors, in particular for ascertaining a stoppage of the roller; (vii) one or more rotational acceleration sensors; (viii) one or more sensors for ascertaining ambient moisture, which is preferably disposed on an end face of the roller; (ix) one or more gyroscope sensors for ascertaining the position and/or the orientation of the roller, and in particular for ascertaining the width of a gap between the two rollers of the roller pair, which is dependent on the position and/or the orientation, and the parallelism of the rollers; and/or (x) one or more sensors for ascertaining the width of a gap between the two rollers of the roller pair, and in particular a nip between the two grinding rollers of the grinding roller pair, for example a sensor disposed on an end face of the roller, and in particular a MEMS sensor.

Arbitrary combinations thereof are likewise possible. For example, the roller can comprise multiple temperature sensors and deformation sensors. It is also possible and within the scope of the invention that all sensors are of the same type, which is to say designed as a temperature sensor, for example. However, it is also possible and within the scope of the invention that at least one roller comprises, and in particular both rollers comprise, sensors of different types.

Here and hereafter, wear shall be understood to mean the mechanical abrasion of the circumferential surface of the roller, and in particular of the grinding roller. Such wear can be determined, for example, by way of a change in resistance, and in particular by way of a change in electrical resistivity, which results from material removal on the circumferential surface. As an alternative or in addition, wear can be determined by way of changed pressure and/or by way of a changed travel length and/or by way of changed electrical capacitance.

If one or both rollers comprise multiple sensors and at least one data transmitter, at least one or all data transmitters can be designed for the non-contact transmission of the measurement values from multiple sensors to a data receiver. At least one roller can comprise a data transmitter for the non-contact transmission of the measurement values. The fewer data transmitters the roller comprises, the simpler is the design of this roller.

If at least one roller comprises only a single data transmitter, this roller can comprise at least one multiplexer, which is disposed and designed to alternately transmit the measurement values detected by the sensors to the data transmitter.

The non-contact transmission can take place, for example, by way of infrared radiation, by light pulses, by radio frequency signals, by inductive coupling or by any arbitrary combination thereof.

The non-contact transmission of the measurement values here and hereafter always also encompasses the transmission of data that is obtained by appropriate processing of the measurement values and is thus based on the measurement values. For example, at least one roller, and in particular both rollers, can comprise at least one signal converter, and in particular at least one analog-to-digital converter (A/D converter; also ADC), for converting the measurement values detected by the at least one sensor. At least one signal converter can be assigned to each sensor, which converts the measurement values detected by this sensor. Subsequently, the converted signals can be fed to an above-described multiplexer. If the signal converters are A/D converters, the multiplexer can be a digital multiplexer. In a second possible variant, the signal converter can also be disposed between an above-described multiplexer and the data transmitter. In this case, the multiplexer can be an analog multiplexer.

At least one roller can comprise a roller body, which is described hereafter, and/or at least one roller and/or at least one energy receiver and/or at least one energy generator. With this, a supply of power to the at least one sensor and/or at least one multiplexer and/or at least one signal converter and/or the at least one data transmitter and/or at least one data transmitter of a measuring device described hereafter can be achieved. In particular, this can be an inductive energy receiver. In this variant, the energy receiver can, for example, comprise at least one receiving coil, by way of which electromagnetic energy can be coupled inductively. As an alternative or in addition, however, the energy receiver can also be designed to receive luminous energy. As an alternative or in addition, however, it is also possible and within the scope of the invention that at least one grinding roller comprises, and in particular both rollers comprise, a battery, and in particular a rechargeable battery, by way of which the described power supply can be achieved.

The energy generator for producing energy can be formed of the movement of the roller. For example, the energy generator can be designed to produce energy from (i) thermal differences within the roller, in particular by utilizing thermoelectric effects, such as the Seebeck effect, the Peltier effect or the Thomson effect, for example by way of a thermocouple, and/or (ii) vibrations of the roller, for example by way of at least one piezo element and/or mechanically, and/or (iii) the rotation of the roller, for example by way of at least one piezo element and/or mechanically. The roller can comprise both at least one energy receiver and/or at least one energy generator, and at least one rechargeable battery, which can be recharged by the energy receiver and/or energy generator.

At least one roller can comprise at least one printed circuit board (and in particular a MEMS printed circuit board), on which the at least one sensor and/or at least one multiplexer and/or at least one signal converter and/or the at least one data transmitter and/or at least one energy receiver and/or at least one energy generator are disposed. The printed circuit board can comprise measuring lines by way of which the sensors are connected to the multiplexer. Such a printed circuit board has the advantage that the aforementioned components can be arranged thereon in a very compact manner, and that the printed circuit board can be produced as a separate assembly and, at least in some exemplary embodiments, can be replaced as needed. As an alternative to a printed circuit board, the sensors, however, can also be connected via a wiring harness to the data transmitter and/or the multiplexer.

At least one of the rollers can comprise a roller body including at least one receiving opening and at least one measuring device, which is insertable or inserted, in particular detachably, in the receiving opening. The circumferential surface of the roller body forms at least a portion of the circumferential surface of the roller, and in particular the entire circumferential surface of the roller.

The measuring device comprises at least one of the sensors of the roller. Moreover, it can comprise at least one multiplexer and/or at least one signal converter. This at least two-part design of the roller likewise allows separate assemblies to be produced. In particular when the measuring device is inserted detachably in the receiving opening, it can be easily replaced, for example if it needs to be cleaned or serviced or is defective.

The receiving opening can essentially by formed, for example, by a cylindrical borehole having a diameter in the range of 5 mm to 40 mm, preferably of 5 mm to 25 mm, and particularly preferably of 10 mm to 18 mm. This borehole can extend substantially parallel to a rotational axis of the roller body. So as to be able to determine the state of a circumferential surface, the receiving opening is preferably disposed in an outer region of the roller body. The receiving opening can thus be located in a cylinder ring-shaped region of the roller body, for example.

The receiving opening can essentially extend along the entire length of the roller body in the direction of the rotational axis, which is to say along at least 50%, preferably at 70%, and particularly preferably up to 100% of the entire length of the roller body. In this way, the state of the roller can also essentially be determined along the entire length thereof.

The measuring device can be rod-shaped and have a longitudinal axis along which multiple sensors, for example temperature sensors, are disposed.

The receiving opening can also be formed in a circumferential surface of the roller body, for example. In particular, it may extend essentially in the radial direction of the roller body, which is to say essentially perpendicularly to a rotational axis of the roller body. When a measuring device is inserted in such a receiving opening, a state of the circumferential surface of the roller can be measured particularly easily, for example a temperature present on the circumferential surface.

The roller body can include both at least one radial receiving opening, which is formed in a circumferential surface of the roller body and in which at least one of the sensors is disposed, and at least one axial receiving opening, which is to say extending parallel to the rotational axis, in which the printed circuit board is disposed. The sensors can be either joined to the printed circuit board or designed and disposed relative to the printed circuit board so as to be able to communicate therewith in a non-contact manner, for example by way of ultrasound, infrared radiation, inductive coupling, radio frequency signals or by any arbitrary combination thereof.

The measuring device can be designed as a bolt including a thread, and the receiving opening can include a mating thread in which the thread of the bolt can be screwed. As an alternative or in addition, the measuring device can be designed as a bolt comprising a first bayonet connector element, and the receiving opening can comprise a second bayonet connector element into which the first bayonet connector element of the bolt can be inserted. The first and/or the second bayonet connector elements can comprise a retainer. This embodiment in the form of a bolt is particularly suited when the bolt comprises a sensor designed as a wear sensor, as a pressure sensor or as a temperature sensor.

The measuring device, and in particular the bolt, can comprise at least one further data transmitter and at least one further data receiver, for example. The data transmitter of the measuring device and the data receiver are designed and disposed such that the measurement data detected by the sensor can be transmitted from at least one further data transmitter to at least one further data receiver in a non-contact manner. This is advantageous, in particular, when the measuring device can only be detachably inserted in the receiving opening; during insertion, no cable connections then have to be established, and in particular no cable connections between the measuring device and the roller body.

The non-contact transmission from the further data transmitter to the further data receiver can, in particular, take place through an interior space of the roller body, and in particular through a cavity of the roller body. A transmission through a cavity is not very susceptible to disturbances and additionally requires only comparatively low transmission power. The non-contact transmission from the further data transmitter to a further data transmitter can take place, for example, by way of infrared radiation, by light pulses, by radio frequency signals, by inductive coupling or by any arbitrary combination thereof.

The measuring device, and in particular the bolt, can be supplied with energy inductively and/or by way of light. As an alternative or in addition, the measuring device, and in particular the bolt, can comprise an above-described energy receiver and/or an above-described energy generator, which is designed to produce energy from the movement of the roller, for example from (i) thermal differences within the roller, in particular by utilizing thermoelectric effects, such as the Seebeck effect, Peltier effect or Thomson effect, for example by way of a thermocouple, and/or (ii) vibrations of the roller, for example by way of at least one piezo element and/or mechanically, and/or (iii) the rotation of the roller, for example by way of at least one piezo element and/or mechanically.

As an alternative or in addition, the measuring device, and in particular the bolt, can comprise at least one battery, and in particular a rechargeable battery. Furthermore, as an alternative or in addition to a data receiver integrated in the roller body, a product processing system comprising the roller pair, and in particular a grinding system comprising the grinding roller pair, can also comprise a data receiver that is disposed outside the roller. Such a data receiver can be rod-shaped and extend, in particular, perpendicularly to a rotational axis of the roller.

If multiple receiving openings are present, these can be disposed in various positions along a rotational axis of the roller body and/or at various angles about this rotational axis. The more uniformly the receiving openings are distributed, the more meaningful are the measurement values detected by the measuring devices inserted in these receiving openings. The receiving openings are preferably uniformly disposed in the circumferential direction, yielding a rotational equilibrium, whereby otherwise necessary balancing can be dispensed with.

The at least one data transmitter and/or the data receiver and/or the energy receiver and/or the energy generator are preferably disposed on an end face of this roller or these rollers, and in particular on an end face of a roller body of this roller or of these rollers. On such an end face, the non-contact transmission of the measurement values is hardly, or not at all, impeded by the product ground by the roller.

An above-described printed circuit board can be an integral part of the measuring device in one embodiment. The at least one sensor and/or at least one multiplexer (and in particular at least one above-described multiplexer) and/or at least one signal transmitter (and in particular at least one above-described signal transmitter) can be disposed on this measuring device.

The roller can comprise at least one data memory, and in particular an RFID chip. In this data memory, for example, an in particular individual identification of the roller can be stored or storable. As an alternative or in addition, at least one property of the roller can be stored or storable in the data memory, such as at least one of the dimensions thereof and/or the camber thereof. The data stored in the data memory is preferably likewise transmitted in a non-contact manner. The roller can comprise a data transmitter for this purpose. It is conceivable that the data of the data memory is transmitted by way of the same data transmitter which is used, according to the invention to transmit the measurement values of the at least one sensor.

The measuring device can be inserted, for example detachably, in a receiving opening of a roller body of a roller of a roller pair. In particular, the receiving opening can be formed in a circumferential surface of the roller body. The roller can be a grinding roller of an above-described grinding roller pair. The roller body can be the roller body of such a grinding roller.

The measuring device comprises at least one sensor for detecting measurement values that characterize a state of the roller, and in particular a state of a circumferential surface of the roller. Moreover, the measuring device can comprise at least one data transmitter for transmitting the measurement values to a data receiver, in particular in a non-contact manner. In a first variant, the data can be transmitted to an above-described static data transmitter. In a second variant, however, the data can also be transmitted to a likewise above-described data receiver, and in particular to an above-described further data receiver or to a data receiver of the roller body.

The measuring device can also comprise a data processor integrated therein, and in particular a microprocessor, an FPGA, a PLC processor or an RISC processor. This data processor can, for example, further process the measurement values detected by the at least one sensor and then, optionally, transmit these to the data transmitter, in particular when the same is comprised in the roller. In particular, the data processor can entirely or partially assume the function of the above-described multiplexer and/or of the above-described signal converter. The microprocessor can be an integral part of the likewise above-described printed circuit board. As an alternative or in addition, the microprocessor can also assume at least one of the following function: communicating with at least one data bus system (in particular managing IP addresses); managing printed circuit board memory; controlling in particular below-described energy management systems; managing and/or storing identification features of the roller(s), such as geometric data and roller history; managing interface protocols; wireless functionalities.

The measuring device, and in particular the printed circuit board, can furthermore include an energy management system, which is able to carry out one, more or all of the following functions: (i) regularly, and in particular periodically, transmitting the measurement values from the data transmitter; (ii) transmitting the measurement values from the data transmitter only if a predefined condition is present, in particular with fulfillment of a below-described warning criterion; and (iii) regularly, and in particular periodically, charging and discharging a capacitor or an energy store.

The product processing system for processing a product, and in particular the grinding system for grinding material to be ground, comprises at least one above-described roller pair, and in particular a grinding roller pair. A gap is formed between the rollers of the roller pair. In particular, a nip is formed between the grinding rollers of the grinding roller pair. Within the scope of the invention, only one of the two rollers of the roller has to be designed according to the invention, however, the invention also covers embodiments in which both rollers of the roller pair are designed according to the invention, which is to say comprise at least one above-described sensor and optionally at least one above-described data transmitter. In particular during the grinding of material to be ground, this material to be ground is guided essentially in a vertically downward manner through such a nip. Moreover, in particular during the grinding of material to be ground, this material to be ground is preferably fed to the grinding rollers by virtue of the gravity thereof, wherein this may optionally be pneumatically supported. The product, in particular the bulk material, and in particular the material to be ground, can be granular and move through the nip in the form of a fluid flow. In particular during the refining of masses, such as chocolate masses or sugar masses, this mass may alternatively also be guided from the bottom upwardly through the gap formed between the rollers.

In summary, the measuring device can (i) comprise at least one signal converter and/or (ii) be designed as a bolt including a thread, which can be screwed into a mating thread of the receiving opening of the roller body, and/or (iii) be designed as a bolt comprising a first bayonet connector element, which can be inserted into a second bayonet connector element of the receiving opening of the roller body, and/or (iv) comprise at least one printed circuit board, on which the at least one sensor and/or at least one multiplexer, and/or (v) at least one signal converter are disposed, and/or (vi) comprise at least one sensor, which is designed as a temperature sensor, wherein preferably multiple temperature sensors are present, which are disposed along a rotational axis of the roller so as to be able to ascertain a temperature profile along this direction, and/or (vii) comprise at least one sensor which is designed as a pressure sensor, and/or (viii) comprise at least one sensor which is designed as a force sensor (for determining the force component(s) in one or more directions), and/or (ix) comprise at least one sensor which is designed as a wear sensor, and/or (x) comprise at least one sensor which is designed as a vibration sensor, in particular for ascertaining a product build-up, which is to say an adherence of the processed product to the circumferential surface of the roller, which impedes processing, and in particular grinding, in this position, and/or (xi) comprise at least one sensor which is designed as a deformation sensor (for determining an expansion and/or deflection travel), and/or (xii) comprise at least one sensor which is designed as a speed sensor, in particular for ascertaining a stoppage of the roller, and/or (xiii) comprise at least one sensor which is designed to ascertain ambient moisture and preferably disposed on an end face of the roller, and/or (xiv) comprise at least one sensor which is designed as a gyroscope sensors for ascertaining the position and/or the orientation of the roller, and in particular for ascertaining the width of a gap between the two rollers of the roller pair, which is dependent on the position and/or the orientation, and the parallelism of the rollers, and/or (xv) comprise at least one sensor for ascertaining the width of a gap between the two rollers of the roller pair, and in particular a nip between the two grinding rollers of the grinding roller pair, for example a sensor disposed on an end face of the roller, and in particular a MEMS sensor.

On or outside at least one terminal opening of the receiving opening, the measuring device can comprise at least one data transmitter for the, in particular non-contact, transmission of the measurement values to a data receiver.

The invention relates, for example, to product processing systems, and in particular to grinding systems for grinding material to be ground. The product processing system comprises at least one above-described roller pair. In addition, the product processing system can comprise at least one, in particular static, data receiver for receiving the measurement values transmitted from the data transmitter of at least one of the rollers, and in particular of both rollers, of the roller pair. The above-described advantages can be achieved by such a product processing system. It may be advantageous if only one of the roller pairs is designed according to the invention, in particular when the grinding system comprises several different roller pairs to which the product is fed from the same product inlet.

The grinding system can be a single cylinder mill of a flour mill or an entire flour mill comprising at least one cylinder mill, wherein at least one cylinder mill comprises at least one above-described grinding roller. However, the product processing system can also be designed as (i) a flaking rolling mill for flaking bulk material, in particular grains, milled grain products and grain end products of the milling operation or special milling operation, as described above, (ii) a roller mill or a rolling mill for producing chocolate, in particular a prerefiner comprising two or five rollers, for example, and in particular two or five roller refiners, or an end refiner, (iii) a rolling mill for wet grinding and/or dispersing, for example printing inks, coatings, electronic materials or chemicals, and in particular fine chemicals, in particular a three-roll mill.

The invention also relates to a method for operating an above-described product processing system, and in particular an above-described grinding system. The method comprises one step in which measurement values transmitted from a data transmitter of at least one of the rollers, and in particular both rollers, of the roller pair are received using the data receiver of the product processing system. The data thus received is then further processed and evaluated. For this purpose, the data can be fed to a control unit of the product processing system, and in particular of the grinding system, from where the data can be forwarded to an optional higher-level management system. The entire product processing system, and in particular the entire grinding system, or a part thereof can be controlled and/or regulated by way of the control unit and/or the management system.

The control unit can output a warning, for example, when a predefined warning criterion is met. The warning criterion may be, for example, that the measurement value of at least one of the sensors exceeds a limiting value predefined for this sensor. In another variant, the warning criterion may be that the difference between the greatest measurement value and the smallest measurement value, which are measured by a predefined number of sensors, exceeds a predetermined limiting value.

If the warning criterion is met, a warning signal may be output (for example optically and/or acoustically) and/or the product processing system may be halted (for example by the control unit). Moreover, the control unit can visualize the measurement values detected by at least one sensor or data derived therefrom.

Downstream of the roller pair according to the invention, in terms of the product flow, the product processing system can comprise at least one device for measuring particle sizes and the distributions thereof. In this way, the measurement of the particle sizes and the distributions thereof can be combined, for example, with a measurement of the state of wear and/or the roller contact pressure. This is advantageous, in particular, when the roller, and in particular the grinding roller, is a corrugated roller. As an alternative or in addition, a device for NIR measurement of the product flow, and in particular of the ground material flow, can be disposed downstream of the roller according to the invention, in terms of the product flow, and in particular downstream of the grinding roller according to the invention. This is advantageous, in particular, when the rollers, and in particular the grinding rollers, are smooth rollers. Both variants allow early planning of maintenance work due to the identification of the state of wear.

According to the invention, the surface temperature of at least one roller of a cylinder mill and/or of a grinding device and/or the temperature of a ground product are measured or determined, and more particularly by way of at least two temperature probes or sensors, which measure the temperature in different locations of the at least one roller or of the product veil, as described above. According to the product processing system according to the invention, it is possible to detect and monitor the temperature where it is generated, namely on the surface of the rollers. According to the method according to the invention, the temperature detection and monitoring is carried out during the grinding process. The temperature of the surface of the at least one roller is detected and monitored, wherein additionally the temperature of the ground product can be monitored since the roller transfers heat to the ground product, and the temperature of the grinding rollers can be inferred from the measurement of the temperature of the ground product.

It is possible by way of the product processing system according to the invention to objectively monitor the temperature distribution of grinding rollers continuously during the grinding process of a product batch, for example.

Further parameters may be measured and monitored in the process. For example, the interior temperature of the housing of the cylinder mill and/or the room temperature, which is to say the exterior temperature, can additionally be considered in the monitoring process, since these temperature values influence the temperature of the grinding rollers. By monitoring and controlling the temperature of the roller surfaces, it is possible to optimally configure and control the work and operation of the rollers. If different temperature values are detected across the width of the at least one roller and/or of the product veil, the rollers are re-set with respect to one another by the above-described control unit comprising a corresponding closed-loop control unit. For example, the contact pressure and also the nip can be regulated in the process.

The greater the contact pressure, the greater is the energy demand, which is to say consumption in kilowatts. More comminution energy is generated at a higher contact pressure, some of which is given off as heat to the product to be comminuted, and also to the roller material. This means that the temperature in the interior of the cylinder mill or a similar machine also increases. If the product veil is uniform, the grinding work can be optimized by way of the temperature that develops on the surface of the roller and, according to the invention, is detected by temperature sensors, by varying an optimal temperature assigned to the product to be processed using the contact pressure and/or the nip setting. This variation can be carried out both manually and fully automatically using a computer and/or a controller, such as a programmable logic controller (PLC).

As was already stated above, there are different optimal temperatures for different products to be processed. For example, rice is ground using cold rollers, while wheat can be ground at considerably higher temperatures. The term "cereals and seeds" covers fruits having a hard or soft shell, such as grains, legumes, corn, rice, including husked rice and the like, as well as beans, such as coffee beans, cacao beans or the like. As described before, according to the invention it is possible to monitor the temperature of all roller types, which is to say the surfaces of the rollers. These may be corrugated rollers, smooth rollers or also combined corrugated/smooth rollers.

A temperature measurement is carried out in at least two locations of the surfaces of the rollers and/or of the product veil beneath the rollers. According to the invention, the temperature sensors are disposed in both lateral regions of the rollers or of the product veil. It is also possible to measure the temperature in multiple locations. If three temperature sensors are provided, these are advantageously disposed in both lateral regions and approximately in the center of the rollers or of the product veil. A variable temperature distribution of the surfaces of the rollers is generally based on differing comminution of the material to be ground. If two rollers are not set parallel to one another, for example, the temperature will increase more drastically in the region in which the nip is smaller, while the temperature in the region in which the nip is larger does not increase, or does not increase as drastically. According to the invention, these temperature differences on the surface of the roller are determined, so that the parallelism of the rollers can be set. It should be added that it is also possible for the rollers to be set parallel, and nonetheless a non-uniform temperature distribution to be measured on the surface of the roller. In this case, the inflow of the material to be ground to the cylinder mill must be checked. If the inflow is irregular, a higher temperature of the surface of the roller will be present in the region in which more material to be ground is being fed than in the region in which less material to be ground is being fed.

The system and method according to the invention have the advantage that the operation of a mill becomes safer as a result of automation and system-controlled optimization and monitoring. For one, it is no longer necessary for the miller or employees to check the temperature distribution of the rollers manually as the rollers are rotating. Conducting this kind of check as the rollers are rotating is dangerous. For the check according to the invention, it is no longer necessary to open the housing of the cylinder mill during the grinding process. Another safety aspect is that the temperature detection according to the invention makes it possible, at any time, to observe a sudden increase in the temperature. A sudden increase in the temperature occurs when the rollers directly run against each other with the roller material, which is to say, for example, steel on steel, rubber on rubber, casting on casting, polymer on polymer, porcelain on porcelain, stone on stone, and so forth. In this case, it is possible for the closed-loop control unit to increase the nip within a very short time to a safe position, or even to carry out a rapid shut-down. The system and method according to the invention furthermore make it possible to check the quality of the surfaces of the grinding rollers. An excessively high temperature may be an indication that the surfaces of the grinding rollers are no longer acceptable. This can be checked based on the ground product. If the ground product is acceptable, but the temperature of the rollers is too high, this means that the surfaces of the rollers are no longer acceptable. In this case, for example, the corrugations have been worn down, which is to say the roller is too smooth. The method according to the invention makes it possible to optimize the product flow and operate the production system by providing simple monitoring options and predefined values, which are obtained by way of experimentation, for example. The measuring device according to the invention can operate fully automatically, which is to say measurement points are scanned by a closed-loop control unit. However, the measuring device can also be transported from one measurement point to another manually. As described, in particular infrared temperature measuring devices can additionally be employed for detecting the temperature. In this case, non-contact measurement of temperatures in very broad temperature ranges is possible. According to the invention, the application by way of the infrared measuring system takes place where temperatures of hazardous, difficult-to-reach and moving materials, namely the grinding rollers, are to be measured, without the risk of burns, crushing and contamination.

The temperatures of the surfaces of the rollers depend on the flow pattern, roller material, roller condition, roller corrugation, product properties, bearing design, ambient temperature and so forth. In conjunction with checking the power consumption, individual grinding passes and/or an entire grinding system can be monitored more easily. Checking becomes easier, in particular for untrained staff. It is therefore an essential advantage of the invention that the temperature is measured where it is generated, namely on the surfaces of the grinding rollers. The measurement of the temperature of the product should approximately yield the same value.

The system-controlled measurement and assessment as to whether the rollers are positioned parallel to one another, and thus have the optimal grinding line, furthermore has the advantage that a plant operator who utilizes the system and method according to the invention can yield a considerable increase in grinding efficiency. Compared to the particle size measuring device, the system according to the invention is also economical. Compared to current temperature rods, which are mounted over the rollers, the system according to the invention (i) responds more quickly since the system is integrated directly in the roller, (ii) is two times less expensive, (iii) is food safe, and (iv) can integrate more functions (such as the option of unambiguous roller identification and state of wear, and the like).

In the form of one variant embodiment, the system according to the invention can also be installed in the balancing hole that is already present in each roller. It comprises the transmitter unit, the microprocessor, the battery, a temperature sensor and a vibration sensor. The roller temperature can be estimated, for example in the middle, by way of extrapolation and an appropriate roller heating model. The quality of this estimation is enhanced when two systems (left/right) are used. In this variant, the balancing hole, which is already present today, is drilled through entirely or almost entirely. The sensor system is accommodated therein. Temperature sensors are distributed across the length of the rollers, which are oriented toward the surface. If the passage (which is to say, product guidance, typically including grinding and screening) has a different gap on the left or right, the roller will heat differently. The temperature sensors can establish this difference quickly. The temperature values are wirelessly transmitted to the machine controller or directly to the control unit and/or to an IoT cloud at regular intervals and evaluated. Algorithms evaluate the current data and recommend as to how the equipment operator is to vary the gap for the rollers to be positioned optimally with respect to one another, or they indicate to the aforementioned closed-loop control unit by way of appropriate control commands as to how the roller setting is to be changed.

The sensor systems installed in the rollers can be equipped, for example, with a Bluetooth Low Energy chip for wirelessly transmitting the temperature and vibration data and run time. The BLE chip enables unambiguous roller identification, which can be stored via the Internet in a central database. The unique roller number also forms the first parameter of the values associated with the roller, such as the type of roller, camber and maximum roller temperature. The values form an entire roller data set, which allows the equipment supplier to ship or replace the correct rollers quickly in the event of service. Moreover, a corresponding equipment supplier can also provide an offer in a targeted manner since the state of the roller is also known from corresponding algorithms.

So as to compensate for the temperature development within a roller, the roller may be produced with a camber to allow the roller to grind efficiently in all sections (left/center/right) when heated. By way of the temperature sensors distributed across the entire length of the roller, it can be established whether the camber is too much or too little (running empty). The system can notify the equipment operator by way of appropriate algorithms as to which camber is best suited for the mode of operation or the most frequent product.

The assessment of the roller gap is carried out based on the temperature measurement. The temperature development is a function of the contact pressure of the rollers. Moreover, the system may make it possible to see remotely whether a roller has become dangerously heated and may warn the operator by way of an emergency call/text message or, for example, shut off the system in an automated manner.

The assessment of the roller state in terms of wear takes place based on the temperature and vibration measurement as well as additional values, such as roller run time, power consumption of the roller drive motor, frequency of the processed product (soft/average/hard). An algorithm of the control unit, which includes the aforementioned wear parameters, calculates the current roller state. The control unit or the equipment operator can thus initiate a roller replacement/service in a timely manner. This influences the overall grinding and energy efficiency. Worn rollers are guided lower and thus consume more energy, which is reflected in the operating costs.

In some embodiments, electronic circuitry or processing circuitry including, for example, a microprocessor, programmable logic circuitry, field-programmable gate arrays (FPGA), or programmable logic arrays (PLA) may execute computer readable program instructions by using information from the computer readable program instructions to configure or customize the electronic circuitry, in order to perform aspects of the present disclosure.

LIST OF REFERENCE NUMERALS

1/1' first roller of a grinding roller pair
1a roller measuring parameter
1a1 roller temperature
1a11 actual value
1a12 setpoint value
1a13 temperature gradient
1a2 vibration
1a3 acceleration/deceleration
1a4 remaining service life of the roller 1/1'
1a5 wear parameter
1a6 roller shape
1a7 twist of the roller
1a8 number of corrugations
1b identification means/RFID
1b1 roller number
1b2 corrugation identification/corrugation type
2/2' sensors
2a temperature sensor
2b vibration sensor
2c accelerometer
2d pressure sensor
2e force sensor
2f wear sensor
2g deformation sensor
3 circumferential surface of the grinding roller 1
4/4' data transmitter
5/5' data receiver
6/6' multiplexer
7/7' signal converter
8/8' printed circuit board
9/9' energy receiver, energy generator
10/10' roller body
11/11' receiving opening
12/12' measuring device
13' thread of the measuring device 12' designed as a bolt
14' mating thread of the receiving opening 11'
17' interior or cavity of the roller body 10'
18/18' grinding system
181 operating parameter of the grinding system
1811 roller setting
18111 gap width of the roller pair/distance between the rollers
18112 rotational speed
18113 diagnostic indicator for product build-up
18114 parallelism of the rollers
1812 energy consumption
19 second grinding roller
20 end face or distal end of the grinding roller
21 magnet for inductive coupling
22 line between data receiver 5/5' and control unit 23
23 control unit, control device
231 closed-loop control unit
232 alarm device
2321 alarm trigger 2322 alarm trigger parameter
2323 alarm switch
233 shut-down device
2331 shut-down trigger
2332 shut-down trigger parameter
2333 shut-down switch
24 display means of the control unit 23
25 additional line
26 optional higher-level management system
27 grinding roller position with dry running
28 self-optimizing, adaptive product processing system
29 cable/data bus
30 connector
31 microprocessor
32 energy store
33 roller pair
34 unit for machine learning
341 monitoring unit
342 learning unit

The invention claimed is:

1. A system, comprising:
a grinding system including:
control circuitry including data receiving circuitry;
at least one roller pair, wherein the at least one roller pair includes two rollers for processing a product, at least one of the rollers including a plurality of sensors for detecting measurement values indicating a state of the at least one of the rollers, each of the rollers including a rotational axis;
a measuring device in a receiving opening of a roller body of the at least one of the rollers of the at least one roller pair for processing the product, the measuring device including at least one of the plurality of sensors for detecting the measurement values indicating a state of the at least one of the rollers, the measurement values from the at least one of the rollers of the at least one roller pair being received from data transmitting circuitry of the measuring device using the data receiving circuitry of the control circuitry, wherein:
the control circuitry is configured to identify at least one of a type of the at least one of the rollers and identification of the at least one of the rollers based on electronically stored data of an identifier,
the plurality of sensors, connected to the control circuitry, including two or more temperature sensors disposed along the rotational axis of the at least one of the rollers for ascertaining at least one of a temperature profile and a temperature gradient of the at least one of the rollers,
the plurality of sensors further include at least one of a vibration sensor and an accelerometer for monitoring at least one of a rotational speed and an acceleration/deceleration of the at least one of the rollers, and
the control circuitry includes machine learning circuitry configured to generate and predict at least one of a remaining service life of the at least one of the rollers, wear parameters of the at least one of the rollers, an operating parameter of the at least one of the rollers, a roller operation and a width of gap between the two rollers of the at least one roller pair, and a parallelism of the two rollers which are optimizable in an automated manner by at least one of the control circuitry and closed-loop control circuitry connected to the control circuitry based on the measurement values which have been received by way of the machine learning circuitry.

2. The system according to claim 1, wherein the at least one of the two rollers comprises the data transmitting circuitry, a microprocessor, an energy source, two of the temperature sensors, and the vibration sensor.

3. The system according to claim 1, wherein:
the at least one of the rollers comprises distal ends, the measuring device including one of the temperature sensors in a region of the distal ends of the at least one of the rollers, the temperature gradient for the at least one of the rollers being measurable by way of the temperature sensors of the respective distal ends.

4. The system according claim 1, wherein:
the control circuitry measures the temperature gradient along the at least one of the rollers using at least one of the temperature sensors, the temperature gradient which has been measured is transmitted to the control circuitry, at least one a distance between the rollers of the at least one roller pair and parallelism of the at least one roller pair being corrected in an optimized manner by way of the control circuitry based on the measured temperature gradient.

5. The system according to claim 1, wherein:
the control circuitry identifies the at least one of the rollers using an identification tag of the least one of the rollers, the identification tag including electronically stored data indicating at least one of a roller number and a corrugation identification of the roller.

6. The system according to claim 1, wherein:
a temperature of the at least one of the rollers is measured and monitored continuously using at least one of the temperature sensors and the control circuitry.

7. The system according to claim 1, wherein the at least one of the rollers comprises:
an RFID tag, at least one of the temperature sensors, the accelerometer, the vibration sensor, and the control circuitry which generates parameters regarding at least one of a remaining service life of the at least one of the rollers, wear parameters of the at least one of the rollers, the operating parameter of the at least one of the rollers, the rotational speed of the at least one of the rollers, the acceleration/deceleration of the at least one of the rollers, a shape of the at least one of the rollers, and a number of corrugations the at least one of the rollers.

8. The system according to claim 7, wherein:
at least one of the wear parameters and the operating parameter include diagnostic indicators of product build-up.

9. The system according to claim 7, wherein:
the machine learning circuitry of the control circuitry is used for generating the parameters regarding at least one of a remaining service life of the at least one of the rollers, wear parameters of the at least one of the rollers, and the operating parameter of the at least one of the rollers utilizing at least one of the shape, a twist, and the number of corrugations of the at least one of the rollers utilizing closed loop circuitry of the control circuitry.

10. The system according to claim 1, wherein:
an optimization of at least one of an operation of the at least one roller pair and a parallelism of the at least one rollers of the roller pair is performed by at least one of the control circuitry and the closed-loop control circuitry connected to the control circuitry using the measurement values which have been received by way of the machine learning circuitry, the machine learning circuitry comprising monitoring circuitry configured to monitor the received measurement values and learning circuitry, the monitoring circuitry configured to chronologically detect a temperature during a time of heating which is an actual value and a setpoint value of the temperature, and at least one of the width of the gap, the rotational speed, a product build-up, and the parallelism of the two rollers, and the learning circuitry performing a learning process by linking at least two of the actual value and the setpoint value of the temperature during a predetermined period of time, the width of the gap, the rotational speed, the product build-up, and the parallelism of the two rollers.

11. The system according to claim 1, wherein:
the at least one of the rollers includes at least one of an energy receiver and an energy source for supplying power to the at least one of the plurality of sensors.

12. The system according to claim 1, wherein:
the at least one of the rollers includes an inductive energy receiver which wirelessly receives electrical energy via an electromagnetic field.

13. A method for operating the system according to claim 1, comprising:
obtaining measurement values from the measuring device of the at least one of the rollers;
transmitting the measurement values from the measuring device to the control circuitry;
optimizing the system using the machine learning circuitry of the control circuitry using the measurement values which have been obtained with respect to at least one of a shape of the at least one roller, a twist of the at least one roller, and a number of corrugations of the at least one roller.

* * * * *